July 31, 1928.  G. E. MARLATT  1,679,317

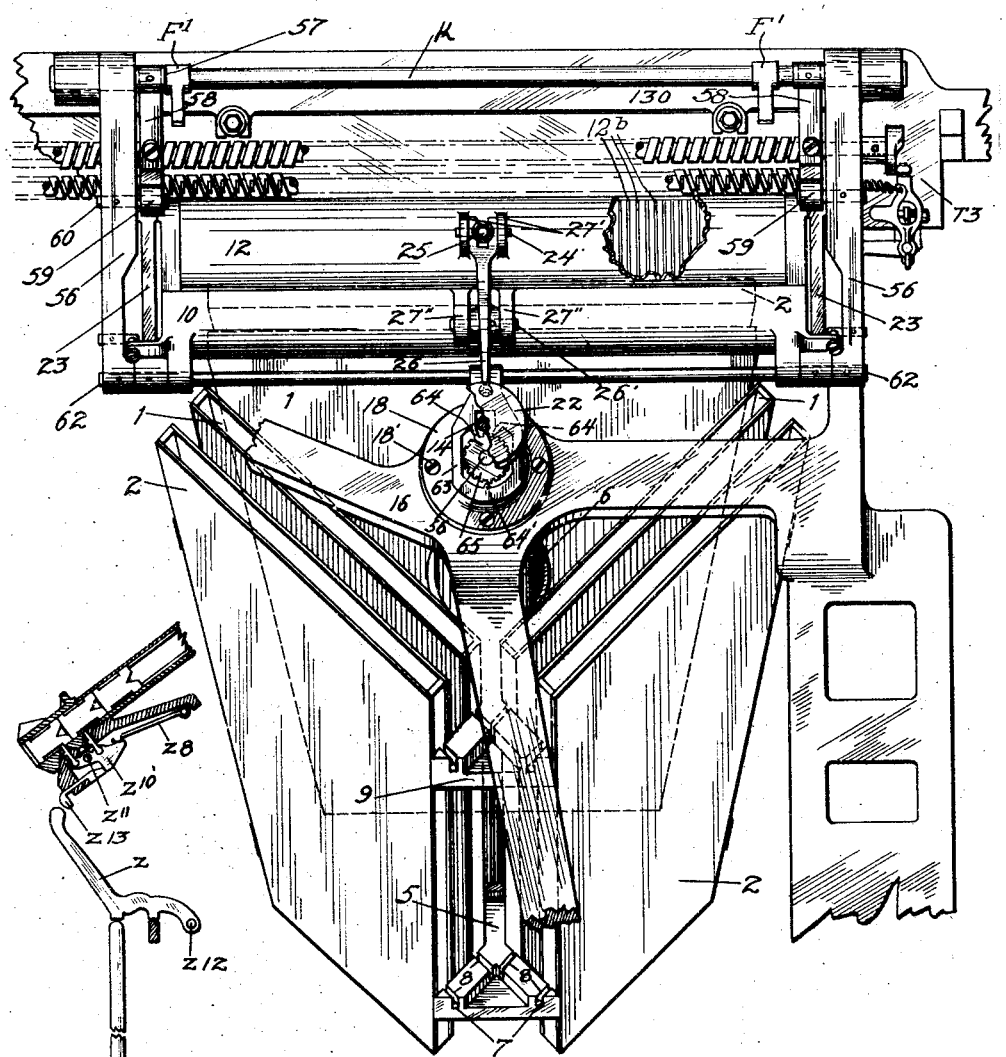
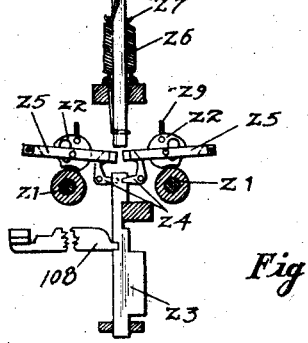
Fig. 2
Fig. 3

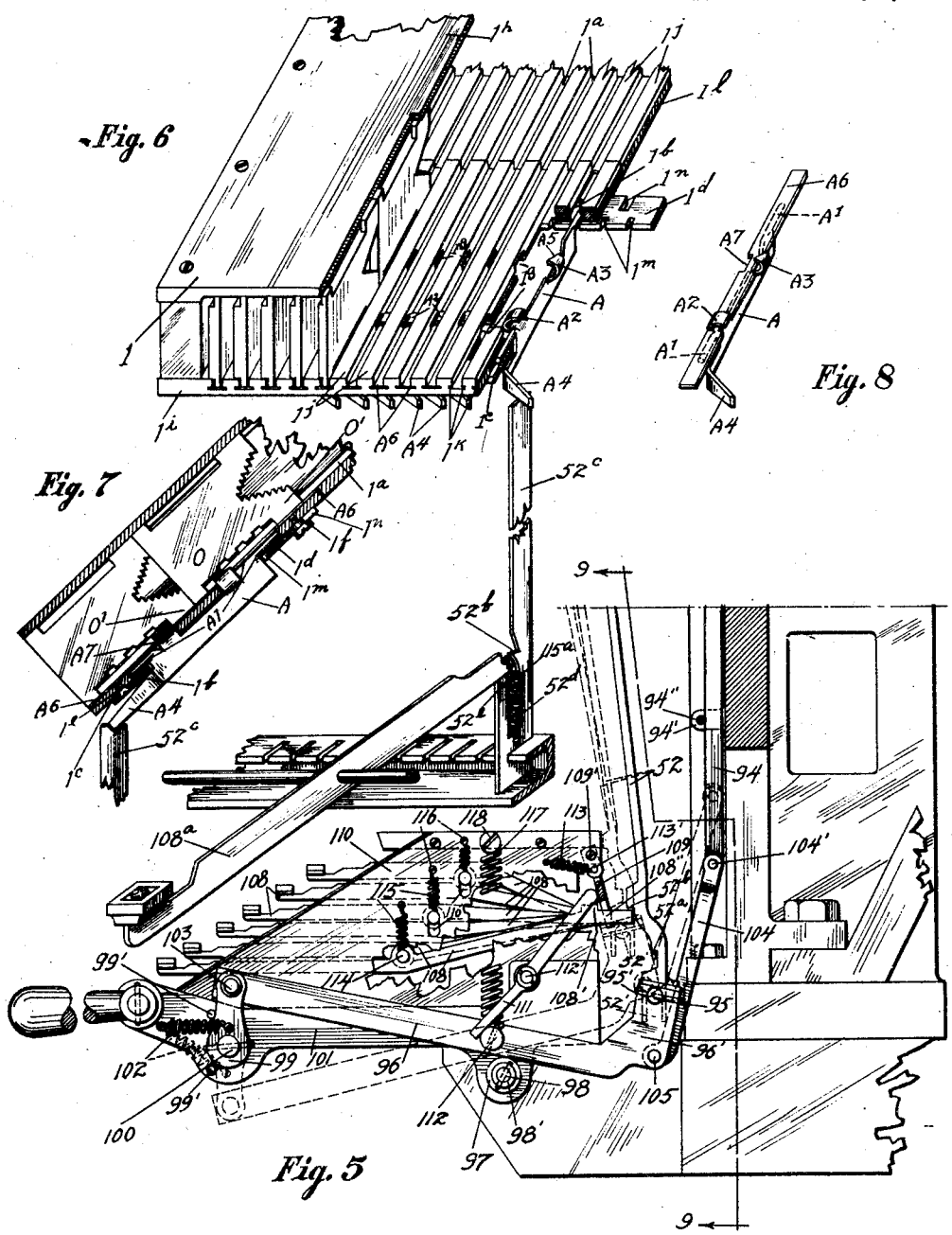

TYPOGRAPHICAL MACHINE

Filed March 24, 1922   10 Sheets-Sheet 5

INVENTOR:
George E. Marlatt

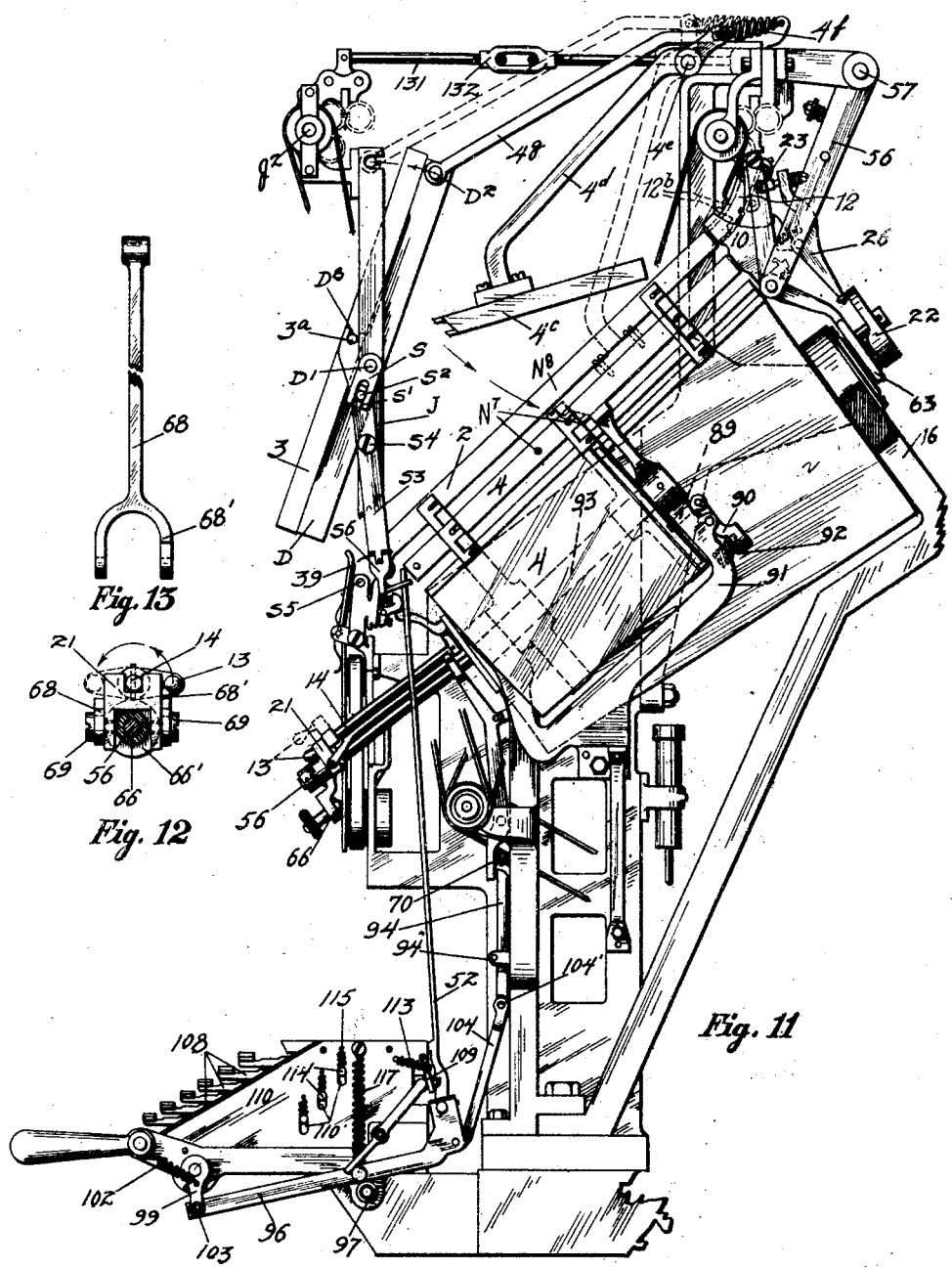

July 31, 1928.
G. E. MARLATT
1,679,317
TYPOGRAPHICAL MACHINE
Filed March 24, 1922    10 Sheets-Sheet 8
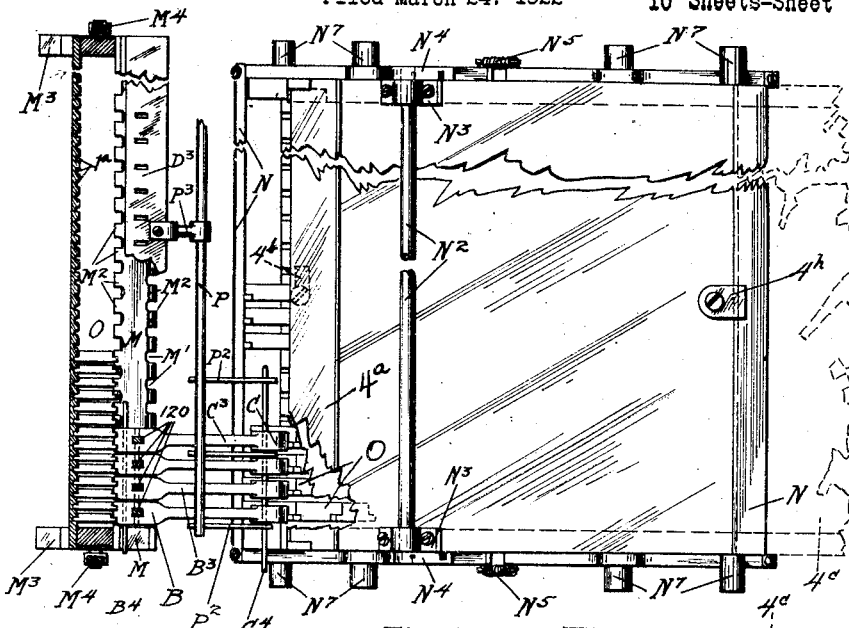
Fig. 16
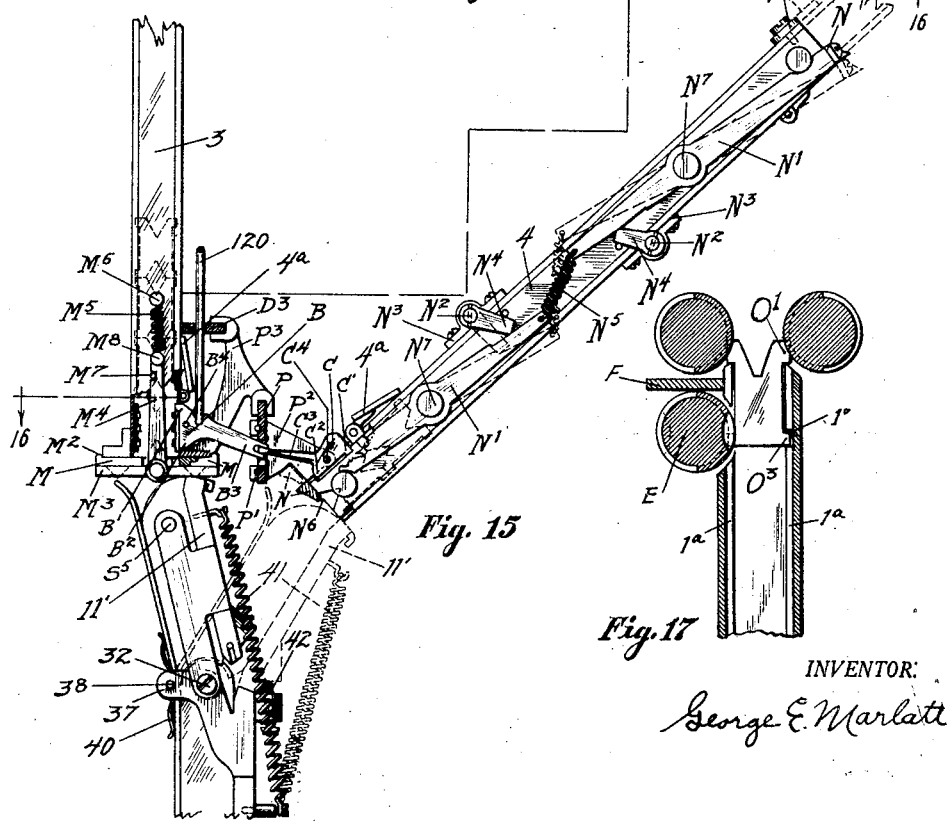
Fig. 15
Fig. 17
INVENTOR:
George E. Marlatt July 31, 1928.
G. E. MARLATT
1,679,317
TYPOGRAPHICAL MACHINE
Filed March 24, 1922    10 Sheets-Sheet 9
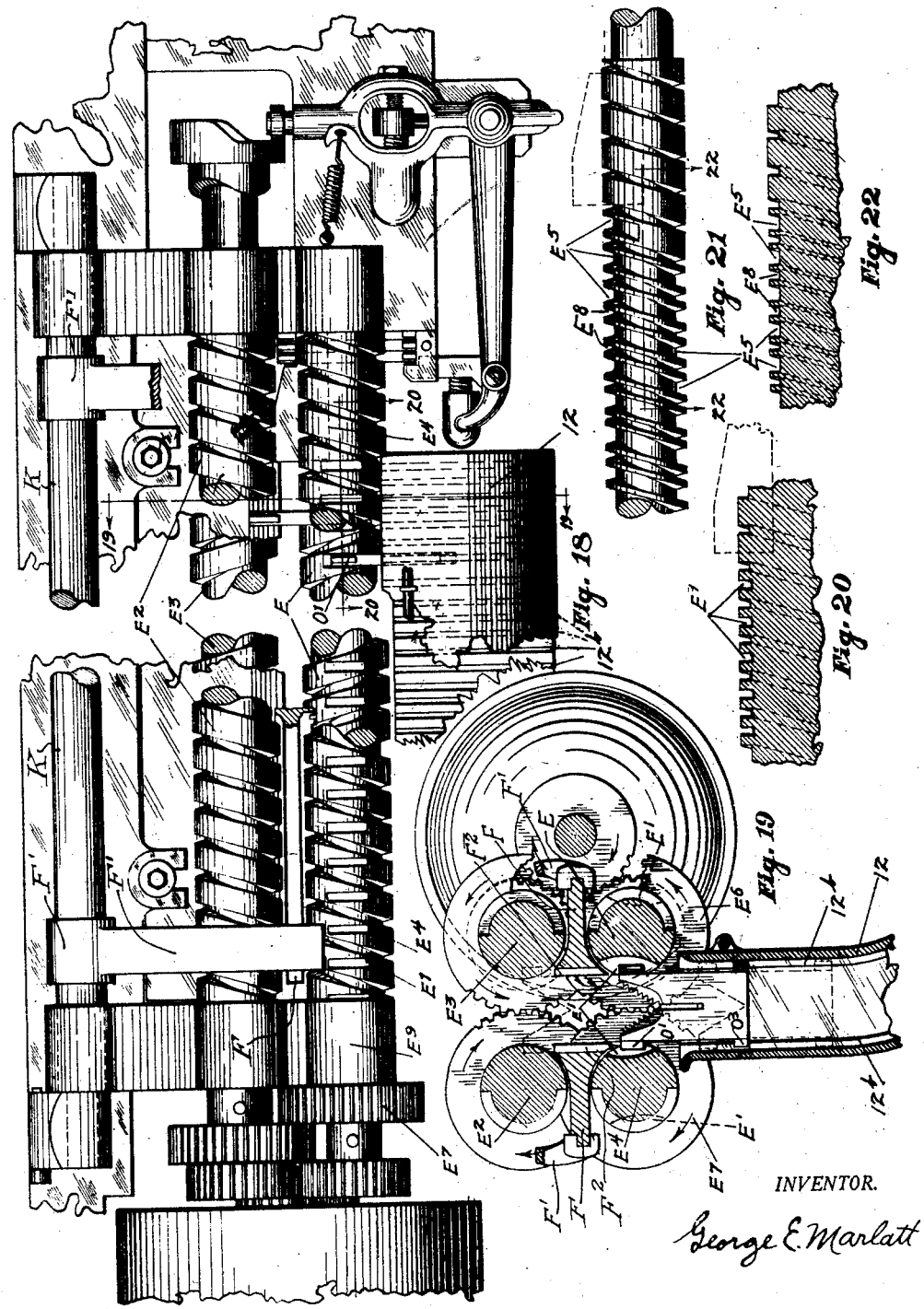
INVENTOR.
George E. Marlatt

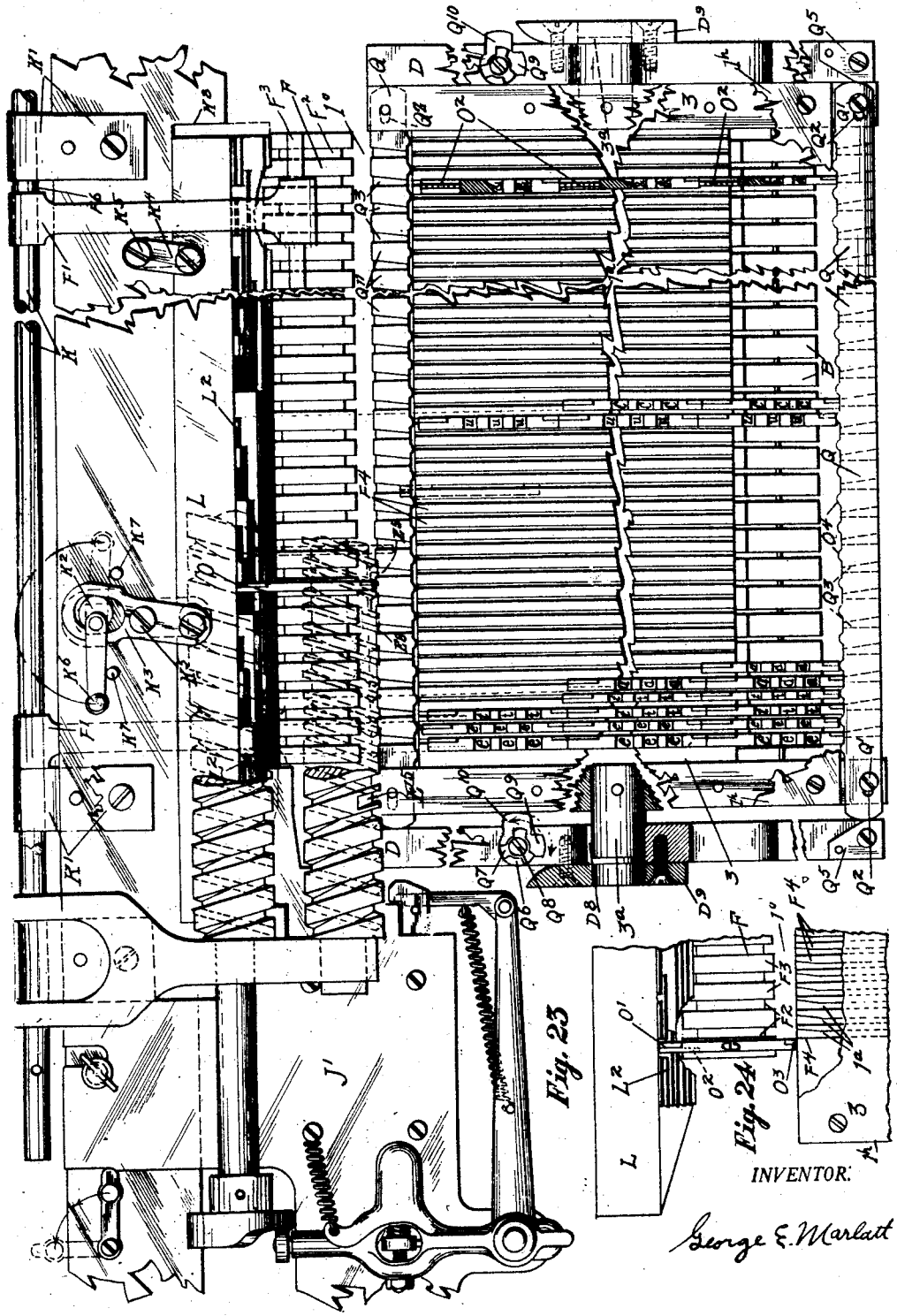

Patented July 31, 1928.

1,679,317

UNITED STATES PATENT OFFICE.

GEORGE E. MARLATT, OF PASADENA, CALIFORNIA.

TYPOGRAPHICAL MACHINE.

Application filed March 24, 1922. Serial No. 546,383.

My invention relates to typographical machines of the character in which type-slugs are cast from assembled matrices which circulate through channeled magazines, the matrices being withdrawn from the magazines in the assembling operation and distributed in the channels thereof following the casting operation. Such machines are represented by the class usually designated as linotype machines and this invention pertains principally to the matrix-magazines of such machines; more particularly, to the number, arrangement and shape of the magazines and the methods and means for withdrawing matrices therefrom and distributing them to the channels thereof.

Compared with certain models of modern linotype machines, those of earlier build were of simpler and more uniform construction, due to the fact that they employed but one magazine; and it is known to operators of such machines that these earlier models are capable of greater production of type than are the later models. But the earlier models were intended to be used only in the production of "news" or "straight" matter, and were limited to the production of only the smaller sizes of type. In the development of such machines in an endeavor to render them capable of producing job, advertising and general display composition many models have resulted, confusing not only in their differences one from another but also in the mechanical intricacies of each model, and with only indifferent success as to the attainment of the desired objective. As a result a general lowering of the earlier standards of typography has ensued where such machines are employed to supplant hand display composition, just as the standard for "straight" composition was lowered by the introduction of the earlier models. This condition is due not only to the limitations of the machines as to number and variety of type faces, but also to their mechanical complications, which are so troublesome as to detract from the average operator's ability as a typographer per se. Further, owing to the complications and consequent cost of such machines it is frequently found that their installation results not only in a lowering of standards as noted above, but also that little or no actual economy in production results in the classes of composition for which they are designed.

This present invention is intended to overcome the limitations and complications of the machines generalized in the foregoing explanation, by providing a simplified machine equipped for any probable requirements as to number, size and variety of type faces.

In the accompanying drawings:

Fig. 2 is a rear elevation of the main magazine system and associated distributor;

Fig. 3 is a view of a typical matrix-releasing system shown for purposes of explanation and comparison only;

Fig. 5 is a continuation of Fig. 4 on the line 5—5 of Fig. 1;

Figs. 6, 7 and 8 illustrate an improved matrix-escapement system;

Fig. 11 is a side elevation in full lines looking toward the sectional elevation shown in Figs. 4 and 5;

Fig. 12 is a section on the diagonal line 12—12 of Fig. 4.

Fig. 13 is a detail from Figs. 4 and 11.

Fig. 15 is an enlargement of a portion of Fig. 11, showing details of the matrix-escapement system for the auxiliary magazines.

Fig. 16 is a plan-and-section view on the line 16—16 of Fig. 15.

Fig. 17 shows means for distributing matrices directly into the magazine channels from the distributor bar.

Fig. 18 shows means for distributing matrices to the magazines through a magazine-entrance channel-group having opposed-groove channels as distinguished from the usual partitioned channels, and in connection with other views discloses means for avoiding interference between the dropping matrices and the lower distributor screw or screws.

Fig. 19 is a sectional view on the line 19—19 of Fig. 18.

Fig. 20 is a section on the line 20—20 of Fig. 18.

Fig. 21 shows modified means for avoiding interference between the dropping matrices and lower distributor screw or screws.

Fig. 22 is a section on the line 22—22 of Fig. 21.

Fig. 23 is a fragmentary front elevation of the vertical magazine and associated distributor, with the front channel-plate of the magazine for the most part omitted.

Fig. 24 illustrates means for distributing matrices regardless of their size directly into opposed-groove magazine-entrance channels.

Similar reference characters indicate similar parts throughout the several views of the drawings.

In these specifications one group of magazines (1, 2) will be referred to as the primary or main magazine group and individual members thereof as primary magazines; the group of magazines 4 to the right of the primary group will be referred to as the tandem auxiliary group, and individual members thereof as tandem auxiliary magazines; and the vertically-mounted magazine 3 will be referred to as the vertical magazine.

It will be noted that the primary group of magazines is arranged in sub-groups of two superposed magazines mounted triangularly about a common axis, so that six magazines comprise the group; but it will be apparent as the description progresses that the group need not necessarily be of triangular shape, but may be of rectangular, septagonal, hexagonal or other geometrical shape according to the number of magazines thought desirable; also the sub-groups of superposed magazines are not necessarily limited to two, and a single magazine may displace such sub-groups, as illustrated in the tandem auxiliary group. Likewise, the tandem auxiliary group is not necessarily limited to three magazines, but may be of any shape or number applicable to the primary group. Also, the multiple arrangement of the inclined magazines would be readily applicable if the group were supported vertically and rotatively beneath a distributor.

Figure 1:
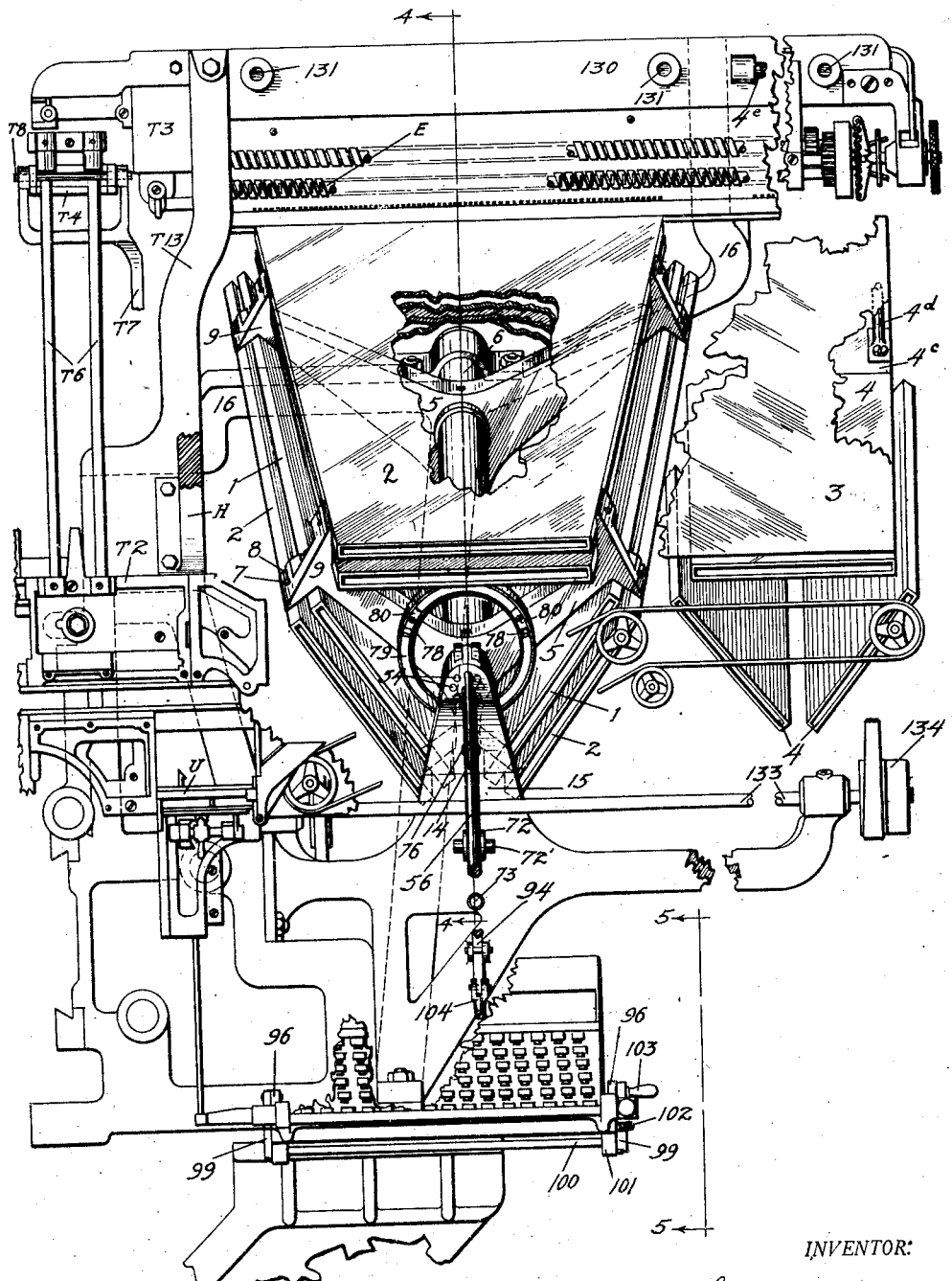
Fig. 1 is a front elevation of the superstructure of a linotype machine showing the position of the keyboard, assembling and distributing elements relative to my improved magazine systems.

In this invention the vertical magazine alone is capable of supplying more type faces than the most complete multiple-magazine machines now in use; therefore it may be considered a sufficient equipment for certain classes of work or as one of a battery of machines, in which case the other magazines, the rear distributor system and certain other mechanism could be eliminated The primary magazines are shown in Fig. 1 as of the usual trapezoidal shape, wider at the receiving end than at the discharging end, but, in view of certain distributor improvements hereinafter described, the excess width of the receiving end is rendered unnecessary and the total width of the tandem groups could to advantage be materially reduced by regulating the width and shape of the magazines solely by the thickness of the matrices intended to be accommodated therein, in which case all of the magazines would be of rectangular shape.

Since the various mechanisms hereinafter described would be as readily applicable to the several groups of magazines if varied in arrangement and shape as above suggested, it will be understood that any such variations are properly included in these specifications and appended claims, and that the invention involved is not limited to the particular arrangement and shape of the magazines shown in the drawings, which is merely by way of example and not necessarily in preferred form under varying conditions and requirements. The use of magazines of the trapezoidal shape would be an initial economy in rebuilding outstanding machines already employing such magazines, but, as hereinafter explained, magazines of rectangular shape would be preferable under most conditions.

The magazines of the primary group are mounted in a rotative cradle composed of front and rear arms 5 secured to a tubular shaft 6. The magazines are each provided with lugs 7 which enter notches 8 formed in the spread ends 9 of the arms 5. The magazines are interchangeable in position in their cradle and are readily removable, preferably from the rear of the machine (Fig. 2) by merely lifting them out of the notches 8. This arrangement permits the removal or insertion of a nonoperative magazine without disturbing the pair of magazines in position for use and therefore without interrupting an operator at the front or keyboard side of the machine when more than one machine is employed and magazines are transferred from one to another machine according to the requirements of the work in hand.

Figure 4:
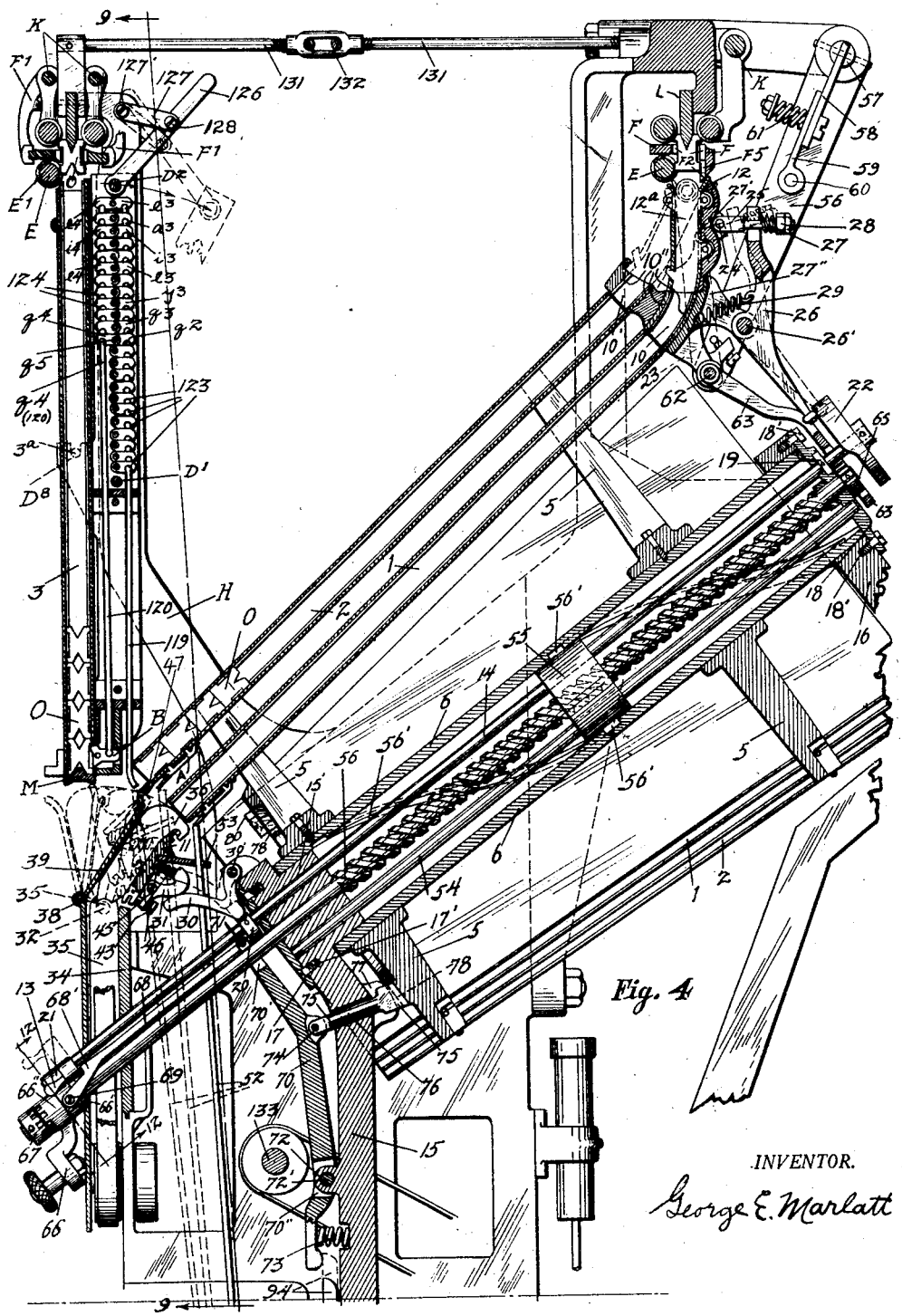
Fig. 4 is a vertical section on the line 4—4 of Fig. 1.

A magazine is in operative position when it registers at its receiving end with one of the entrance channel-groups 10, 10' and at its discharging end with the assembler-entrance channel-group 11. As between two superposed magazines one or the other is rendered operative selectively according to the position of the primary magazine-entrance channel-group 12 and the assembler-entrance channel-group 11. For such purpose these channeled members are movable in unison under control of a handle 13 on an operating rod 14. This operating rod is journaled in the support 15 and keeper-plates 17, 18 and is hindered from longitudinal displacement in a forward direction by a flange 19 thereon, and in the opposite direction the cam 20 thereon serves the purpose. The operating rod is limited to a one-half turn by reason of the handle 13 contacting with either side of a yoke 21. A cam 22 on the rear end of the rod controls the position of the magazine-entrance channel-group 12 and the forward cam 20 controls the position of the assembler-entrance channel-group 11. The magazine-entrance primary channel-group 12 is pivotally supported from the upper ends of arms 23 as more fully described in my U. S. Letters Patent No. 1,266,970, dated May 21, 1918. Hingedly connected by means of a pin 24 to the entrance channel-group 12 is a link 25 which is engaged by the bifurcated end of a centrally-pivoted cam-controlled lever 26. Resilient connection between the lever and the link is established by means of a spring 27 interposed between the end of the lever and tension-adjusting nuts 28 on the link. The cam-controlled lever 26 is pivoted between lugs 27" on the intermediate channel-group 12, and, subject to the control of the cam 22, a spring 29 urges the upper portion of the lever 26 forward, and through the connections described causes the channel-group 12 to register with the upper intermediate channel-group 10' and therefore to be in position to conduct matrices to the upper magazine 2. It will be understood that the lower or reduced surface of the cam 22 controls the lever 26 to permit the action described, while restoration of the cam to the position shown in Fig. 4 will restore the entrance channel-group to a position in co-operation with the lower magazine 1. Coincidently with the cam-controlled movement of the magazine entrance element as just described, the forward cam 20 acts through a pivoted lever 30 and an adjusting member 31 to cause the assembler-entrance channel-group 11 to assume a position corresponding to that of the entrance member 12. The movable portion 11 of the assembler-entrance channel-group is connected by means of hinge-screws 32 and a hinge-pin 33 to the stationary portion 34 of the assembler-entrance plate, as best shown in Figs. 4 and 11. The radius center of the hinge thus formed coincides in position with the center of the lower sections 35 of the channel partitions. The upper, convex ends of these partitions are made thin and enter concave-radial grooves 35' in the lower and relatively thicker end of the upper sections 36 of the partitions. Thus a true joint is maintained between the partition sections regardless of the position of the channel-group 11 in its movement to and from registration with the several magazines. The rigid hinge-brackets 37 (Fig. 15) are sufficiently long to support a rod 38 on which the front channel-plates are supported. The upper front channel-plate section 39 moves with the hinged channel-group section 11 under control of a spring 40 wrapped around the hinge-rod 38. Springs 41 serve to move the channel groups 11, 11' from a higher to a lower position under control of the cam 20, and the extent to which the section may be lowered is limited by banking screws 42 which serve to adjust the channel-groups in accurate registry with the lower of the superposed magazines and with the tandem auxiliary magazine. Similar registration with the upper magazine is obtained by means of an adjusting screw 43 carried by a member 31 pivoted between lugs 44 on the channel-plate 11 on a pivot pin 45. A spring 46 interposed between the member 31 and the channel-plate serves to keep the member 31 in its adjusted position under normal conditions and also cushions the parts in the event that an attempt is made to raise the channel-group when any obstruction, such as a matrix protruding from the end of the lower magazine, interferes with the upward movement of the channel-group under control of the cam 20.

In order that the matrices may be conducted from the upper magazine to the assembler-entrance channels it becomes necessary to provide a bridge 47 (Fig. 9) across the gap which would otherwise exist at this point. This bridge has matrix-guiding channels in continuation of those in the bottom plate of the magazine and is supported on brackets 48 secured to the back of the rigid channel-plate 34 by screws 49 and dowels 50. Screws 51 secure the bridge to the brackets. When the upper or outer magazines 2 are intended to be employed in that position only, the bridge may be an integral extension of the bottom plate of the magazine, in which case the brackets 48 may be dispensed with. It is so shown in Fig. 4.

The two angles of the hinged channel section 11 are substantially the angles heretofore established as correct for properly conducting the matrices from the inclined magazines to the vertical portion 34 of the channel. When the channel is registered with the upper magazine the bridge 47 functions as would the uppermost angle of the channel when in its lowered position, and the uppermost angle of the hinged section becomes an intermediate angle for conducting matrices from the upper magazine. The established requirements for these angles are: that the upper angle be approximately that of the magazine so that matrices may escape from the magazine without binding between the opposed plates thereof; that the angles be such that the characters on the matrices will not be injured when passing thereover, and that the matrices will not accumulate momentum enough to cause them to strike and be retarded by the front plate of the vertical portion of the channel. Experience has also shown that the angle section of the channel must be as short as possible and the remaining portion of the channel truly vertical in order to conduct the matrices rapidly and without transpositions to the assembler. The structure herein illustrated and described is designed with reference to these requirements, involving also an off-setting of the vertical magazine relative to the vertical portion of the delivery channel, in order that the momentum of the matrices therefrom may be controlled by contact of the matrices with the front plate 39 of the hinged channel section.

From the foregoing description it will be apparent that a half turn of the handle 13 will cause the magazine-entrance channel-group and the assembler-entrance channel-group to register for co-operation with either the upper or lower of the superposed magazines, at will. This same movement of the handle causes the upper ends of the escapement-operating reeds 52 to be swung to a position beneath the escapements A of a selected magazine, because of the fact that the guide-plate 53 which controls the reeds is secured to the channel-plate 11 for movement therewith. The manner of raising and lowering the reeds 52 longitudinally for co-operation with a selected magazine is described elsewhere herein.

Figure 9:
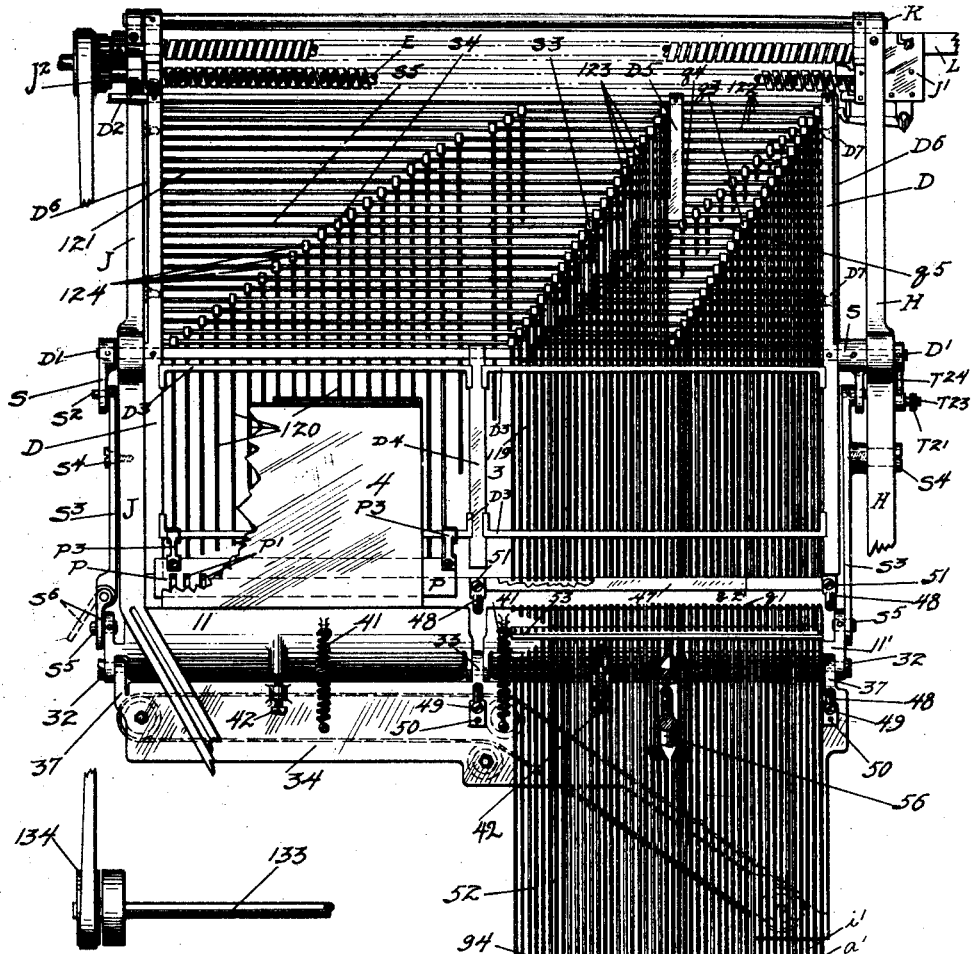
Fig. 9 is a view on the approximate line 9—9 of Figs. 4 and 5.

The cradle on which the primary magazines are mounted is supported between the machine-frame extensions 15 and 16, the forward end of the tubular shaft 6 bearing against the forward frame extension and encompassing a hub 15' thereon for rotative support, while the rear end of the tubular shaft bears in the rear frame extension 16 and is held in place longitudinally by the keeper-plate 18 secured by means of screws 18' to the supporting frame. The forward frame 15 supports the forward ends of a series of rods 54 on which an operating nut 55 is guided for fore and aft movement but is hindered from turning by reason of its engagement with the rods. These guide rods are held in place longitudinally by the keeper-plate 17 at their forward end, and at their rear end by the plate 18 in which they bear. The nut 55 engages spiral grooves 56' formed internally in the tubular shaft 6; therefore, the fore or aft movement of the nut 55 by reason of the turning of the operating screw 56 will cause the entire supporting cradle and the magazines thereon to rotate in a desired direction for bringing a selected pair of magazines to operative position. Since the operating shaft 14, the screw-shaft 56 and the lever 30 must pass through the group of reeds 52, it becomes necessary to deflect those reeds which are adjacent to said members, as shown in Fig. 9. The manner of deflecting the reeds for such purpose may be similar to that disclosed in my U. S. Letters Patent No. 1,266,970.

The magazine-entrance system of this present invention is in most respects similar to the system disclosed in my U. S. Letters Patent No. 1,266,970 aforementioned. The system comprises the primary 12 and intermediate 10, 10' channel-groups supported on yieldable arms 56, these arms being suspended from rigid pins 57 which carry rigid banking-bars 58. These banking elements are overlapped by members 59 mounted on the yieldable arms 56 by means of pins 60. The overlapping members are normally held in parallel contact with the banking elements by the spring 61, all in the manner set forth in said Letters Patent No. 1,266,970. The magazine-entrance system as a whole is thus rendered yieldable against the tensional strength of the springs 61, the purpose being to cause a slight movement of the entrance system in the event that an attempt is made to shift the magazine group when a matrix protrudes from the receiving end of a magazine. In this present invention the shaft 62 on which the channel-groups are supported also supports a yoke 63 having internal teeth 64, 64' between which a clutch member 65 may normally turn without being engaged thereby. The clutch member 65 is fixed to the operating-screw shaft 56 and therefore turns in the yoke 63 when the magazines are shifted as explained; but in the event that a protruding matrix locks a magazine to the intermediate channel-group and an attempt is made to shift the magazines, then the yoke will be forced upward or downward and either the teeth 64 or the tooth 64' will engage the clutch member 65 and further turning of the operating screw will be prevented until the protruding matrix is removed. The direction of movement of the yoke 63 is dependent both on the direction in which the initial movement of the magazines takes place and on which side of the center-line of the magazines the matrix protrudes; for this reason the yoke is rendered operative in either direction as explained.

In the event that a matrix protrudes from the upper end of the magazine close to the center thereof, the above described action of the yoke 63 would not be assured, but the lateral movement of the matrix with the central portion of the magazine would cause sufficient resistance to the turning of the handle 66 to notify an operator that a matrix protruded; and, because of the relative strength of the matrix lugs compared with the ribs separating the matrix channels, any resultant damage would be to the matrices and not to the magazine or entrance channels, (the matrices being easily straightened or replaced and capable of being supplied in surplus quantities near the center of the magazine); also, distributer improvements hereinafter described reduce to a remote probability the chances for a matrix protruding from any of the magazine channels.

In order to turn the screw 56 the handle 66 must be drawn forward into mesh with a co-acting clutch member 67 secured to the end of the screw-shaft. A yoke 21 is held between flanges 66', 66'' of the handle for movement therewith, and a forked link 68 (Fig. 13) is connected to the yoke by shoulder screws 69. At its inner end the link enters a bifurcation 70' in a lever 70, the screw-shaft also passing through said bifurcation. A hinge-pin 71 connects the link to the lever. This lever is pivoted by means of a pin 72' to a lug 72 on the support 15, the lug entering a slot 70'' in the lever. Interposed between the lower end of the lever and the support is a spring 73 the tendency of which is to keep the clutch elements of the handle 66 separated and therefore inoperative. Secured to the lever 70 by means of a hinge-pin 74 is a detent 75 which is loosely supported in an opening 76 through the support 15. The detent 75 terminates in a flattened portion 75' fitting between lugs 77 on the support. This flattened end of the detent engages, selectively, notches 78 in a disk-rim 79 (Fig. 1) integral with the arms 5 of the magazine cradle, and when so engaged serves to hold the cradle in a selected position. From the foregoing description it will be understood that when the handle 66 is drawn forward into engagement with its meshing member 67 such action will take place against the stress of the spring 73 and the detent 75 will be withdrawn to permit the rotation of the cradle when the handle is turned and coincidently with the initial turning of the handle the notch 78 will move from in front of the detent 75 which may then rest against the disk-rim 79 until the continued turning of the handle brings another notch 78 to a position in front of the detent, whereupon the spring 73 will cause the detent to enter the notch and the clutch members of the handle will be disengaged.

With the operating nut 55 in a central position on the screw 56 and the resultant pair of magazines in operative position, a one-third turn of the cradle in either direction will shift one of the other pairs of magazines to operative position; therefore a two-thirds rotation of the triangular group of magazines is the maximum requisite movement in shifting the magazines. Any movement beyond that required and intended is prevented by stops 80 on opposite sides relatively of two of the notches 78, the contact of these stops with the detent limiting the movement of the cradle in either direction.

In connection with the auxiliary tandem group of magazines, I prefer to omit much of the mechanism employed in connection with the primary group. For the auxiliary group a direct-manually operated detent 89 hinged to a lever 90 pivoted on the bracket 91 enters suitable recesses in the arms of the auxiliary magazine cradle and is so held by a spring 92. Pressure on the lever 90 against the spring 92 frees the cradle, which may then be turned direct-manually on its shaft 93.

Reference to the drawings will show that the escapement-operating reeds 52 normally lie beneath the ends of the magazines and would in such position interfere with and prevent the rotation of the magazines. It is therefore necesssary that the reeds be in their lowered and forward position before the handle 66 is turned. To insure the forward position of the reeds prior to the turning of the handle I provide the forked link 68 with a shoulder 68' on one side only of the forked end thereof. When the handle 13 on the operating rod 14 is in that position which permits the reeds 52 to underlie the lower magazine it will at the same time be in front of the shoulder 68' as shown in Figs. 4 and 12, and will therefore prevent the use of the magazine-turning handle 66; but when the operating handle 13 is turned and the reeds thereby moved forward as before described it will be out of engagement with the shoulder 68' and the clutch-handle 66 may then be drawn forward and rendered operative provided the reeds 52 are also in their lowered position. When the reeds are in their raised position for engagement with the escapements of the upper magazine a safety member 94 retains a position between the lower end of the lever 70 and the support 15 and will consequently prevent the use of the handle 66. But when the member 94 is retracted in unison with the lowering of the keyrods as hereinafter described, and the reeds remain in their forward position as previously explained, then only may the magazine cradle be turned.

The escapement-operating reeds rest upon a bar 95 secured at its opposite ends by means of pins 95' to shift arms 96. These shift arms rest upon rollers 97 mounted at opposite sides of the keyboard on a shaft 98 and retained thereon by means of collars 98'. At their forward ends the shift arms 96 are connected to crank-arms 99 which are secured to opposite ends of a shaft 100 journaled in the keyboard side frames 101. The turning radius of the arms 99 is limited in respective directions by stop-pins 99' in the frames 101, and a spring 102 serves to hold the arms against either of the stops, selectively. At one side of the keyboard the connection between the shift arm 96 and the crank-arm 99 terminates in a handle 103. When this handle is in its upper position as shown in full lines in Fig. 5 the reeds 52 are in lowered position; and when the handle is turned to its lower position indicated in broken lines the shift arms are thereby rocked on the rollers 97 and the reeds are raised for engagement with the escapements of the upper magazine.

The safety member 94, the function of which has been explained, is guided between lugs 94' and is held therebetween by a pin 94". It is hinged by means of a pin 104' to a link 104 which is centered on a shaft 105 by means of a collar 106 (Fig. 9). At its opposite ends this shaft is secured to the shift arms 96; therefore the safety member 94 will be raised or lowered in unison with the reeds 52 and will obstruct or permit the turning of the magazines according to the vertical position of the reeds, in the manner and for the purpose explained.

Springs 117 secured by means of screws 118, one at each side of the keyboard, and, at their lower ends, to the shift arms 96 by means of pins 112, serve to carry most of the weight of the reeds 52 and other parts movable with the shift arms 96, so that the raising and lowering of the reeds by use of the handle 103 is easily accomplished.

The escapement operating reeds 52 are spaced apart and guided in a slotted plate 107 secured at its opposite ends to the shift arms 96. Regardless of the length of the slots 107' in the guide plate the reeds are guided edgewise by the rod 95 on which they rest, the ends of the reeds having a bifurcation 52' which engages the rod for accurate guidance edgewise so that there will be no lost motion between the reeds and their supporting rod when they are connected to or disconnected from the finger-key levers in the manner now to be described: With the parts as shown in full lines in Fig. 5 the initial movement of the handle 103 will cause the reeds 52 to be moved backward from their position of engagement with the key-levers 108. Further turning of the handle to raise the reeds will cause the reeds to occupy the forward position shown in broken lines in Fig. 5 and in full lines in Fig. 11. The final downward movement of the handle will cause the lower shoulder 52ª on the reeds to engage the key-levers. In a similar manner the operation of lowering the reeds will first disengage the lower shoulder 52ª and subsequently place the upper shoulder 52ᵇ in engagement with the key-levers. In order that the reeds may be readily connected to the key-levers as explained a slight clearance may be provided between the ends of the levers and the horizontal underside of the shoulders on the reeds.

The key-levers 108 are guided at their rear ends in a slotted guide-plate 109 which is swung between the keyboard side-plates 110 on pivot screws 109'. While the reeds remain connected in either their raised or lowered position with the key-levers the guide-plate 109 is held in a rearwardly-tilted position by levers 111 fixed on opposite ends of a shaft 112' journaled in the keyboard side-frames 101. The normal or forward position of the shift arms 96 causes the pins 112 to contact with the lower ends of the levers 111 for the purpose of holding the guide-plate in the position stated; but when the shift arms 96 are moved rearwardly the levers 111 are immediately freed from the influence of the pins 112, whereupon springs 113 serve to swing the guide-plate to a position above shoulders 108' on the key-levers, thus locking the key-levers against possible displacement while the reeds 52 remain disconnected therefrom.

When the escapement-operating reeds are raised for use in connection with the upper magazine, their lower ends are at the same time moved forward a distance approximating that between the upper and lower escapement groups. This forward movement of the reeds is dependent on the vertical offset portion 96' at the rear ends of the shift-levers 96. The proper action of the reeds in the shifting operation is further insured by so constructing the key-levers 108 that their rear terminations 108" all occupy the same horizontal plane, the key-levers being deflected rearwardly from their fulcrum rods 114 at six different angles for the six banks of keys. As heretofore constructed linotype keyboards have had six fulcrum rods, one for each bank of keys, with fifteen levers pivoted on each rod. In this invention I prefer to simplify the keyboard by using only three fulcrum rods 114 for the ninety levers. Hence the six banks of levers are grouped into three pairs of banks, the fifteen levers of the upper and lower rows of each pair being pivoted on the same rod. Thus each fulcrum rod supports thirty levers. The fulcrum rods project through elongated slots 110' in the opposite end plates 110 of the keyboard. The projecting ends of the rods are secured to springs 115 supported from screws 116 in the end plates 110 of the keyboard. These springs are of sufficient strength to normally keep the rods in engagement with the upper ends of the slots; but in the event of an obstruction of any kind hindering the movement of a reed 52 when a finger-key is depressed, then the spring 115 will yield and the particular key involved, together with others mounted on the same rod will be depressed without raising the rear end 108" of the key-lever. The principal purpose of thus resiliently mounting the key-levers is to protect the escapements A against damage in the event that an obstructed matrix O hinders the proper action of an escapement when acted upon by a reed 52. An optional arrangement for protecting the escapements is illustrated in connection with Fig. 6 in which the key-levers 108$^a$ and escapement-operating reeds 52$^c$ are resiliently connected individually by means of springs 115$^a$ occupying a vertical clearance 52$^d$ in the reed. The spring serves to normally hold the lever against a shoulder 52$^e$ on the reed, but in the event of an obstruction the lever moves away from the shoulder against the tensional strength of the spring, which is hooked to the reed adjacent to the lower end of the clearance. For convenience in assembling or disconnecting the parts a notch 52$^f$ in the reed provides a temporary hook for the upper end of the spring. The modification just described is not adaptable when the escapement-operating reeds are intended to be raised and lowered in connection with superposed magazines.

As stated and explained elsewhere in these specifications, neither the usual forms of keyboard mechanism nor the usual forms of matrix-escapements are adaptable to the magazine systems of this invention. For the primary magazines I provide the form of escapement illustrated in Figs. 6, 7 and 8, one of which underlies each channel 1$^a$ of the magazine. These escapements have rounded fore and aft pivot portions A$^1$ which are confined in slots 1$^b$ coinciding with the channels 1$^a$, and are supported on front 1$^c$ and rear 1$^d$ plates extending across the under side of the magazine to which the front and rear plates are secured by screws 1$^e$ and 1$^f$, respectively, at convenient intervals. The pivot ends A$^1$ of the escapements occupy a position in line with the center of semi-circular escapement pawls A$^2$, A$^3$; therefore, when an escapement is oscillated on its pivots by the action of the operating reed 52 (or 52$^c$) in engagement with the offset or lever portion A$^4$ of the escapement, the forward pawl A$^2$ will move in a circular path from in front of the upper lug O$^1$ of the matrix, thus releasing the matrix. Simultaneously the rear pawl A$^3$ enters the channel 1$^a$ vacated by the forward pawl, and obstructs the following matrix. The edge A$^5$ of the rear pawl is beveled so that the weight of all the matrices in a channel acting against this beveled edge will tend to restore the escapement when the finger-key controlling it is released. As in other forms of escapements the distance between the front and rear pawls is less than the distance between the lugs of a matrix, this distance also including the measurement of the pawls; hence, when the upper lug of a matrix has engaged the rear pawl the front ear will have passed the front pawl, which will obstruct the matrix by engaging the upper lug thereof. Unlike the usual forms of escapements this improved form is not mechanically timed in its action, therefore the actual contact of the matrix with the rear pawl A$^3$ may or may not occur, depending upon the length of time the finger-key remains depressed and the speed of the released matrix in passing from the magazine. In addition to the mechanical timing mentioned the usual form of escapement is deficient in the fact that the pawls thereof act in open perforations through the bottom channels 1$^a$ of the magazine, these openings and the ends of such pawls producing a roughness in the channels which hinders the instantaneous escape of a released matrix. In addition they have a tendency to propel the matrices upward against the walls of the channels in the top plate 1$^h$ of the magazine, thereby depositing in said channels objectional lubricants and other foreign matter accummulated by the matrices when circulating through various parts of the machine. The foreign matter so deposited still further hinders the release of the matrices and at times obstructs them entirely and must be removed. This present invention aims to overcome all the aforenoted objectionable conditions not only in connection with the form of escapement A now being described, but also those employed in connection with the auxiliary magazines. The pawls A$^2$, A$^3$ act in grooves 1$^g$ extending continuously across the bottom-plate section I$^i$ of the magazine and well into the separating ribs 1$^j$ between the channels, hence cutting entirely through the floor of the channels 1$^a$. Following the assembling of the escapements in the notches 1$^b$ and on the supports 1$^e$, 1$^f$ the openings in the floor of the channels are covered by a floor strip A$^6$ which is inserted in grooves 1$^k$ at each side of the channels 1$^a$ and flush with the floor thereof. This strip extends the length of the front section 1$^i$ of the magazine plate and abuts against the rear section 1$^l$ flush with the floor of the channels therein. When thus placed reduced portions A$^7$ of the strip coincide in position with the pawls A$^1$, A$^2$, thus providing ample room for the circular action of the pawls. With the strip in place a smooth and continuous channel is provided for the matrices and the speed of their egress is not limited by any of the usual defects above noted; also the assured rapid escapement of the matrices renders possible the simplified keyboard of this invention, as more fully explained hereinafter. If the magazine channels are made parallel as in this invention provided for, the escapement of the matrices is thereby still further accelerated, for the usual converging channels have a tendency to retard the matrices because of the frictional contact between the matrices and the side walls of the converging channels.

The rear supporting plate 1ᵈ is provided with notches 1ᵐ incident to each escapement. This plate is slidable under the heads of the shoulder screws 1ᵗ which engage slots 1ⁿ in the plate. Therefore the plate may be moved forward until the notches 1ᵐ engage the rear ends of the escapements. When so engaged the escapements are locked against movement and may be so locked for any purpose when the magazine is not in operative use.

It will be noted from the drawings that the exit end of each primary magazine is, as usual, about the same width as the keyboard, and that the vertical magazine of this invention is of considerably greater width, in order that it may contain larger matrices or additional fonts of small matrices. Therefore means are provided for offsetting the escapement operating devices according to the extent to which the escapements of the vertical magazine are offset relative to the keyboard. Provision for the same purpose is disclosed in my U. S. Letters Patent No. 1,366,578 (Jan. 25, 1921), but the means shown in that patent does not contemplate a magazine offset to the extent of the vertical magazine of this invention, hence different means are employed. In Fig. 9, to accommodate the scale of the drawing, only alternate escapement-operating devices are represented. The lower group of reeds 52 have already been described in their relation to the escapements of the primary magazines, and these same reeds actuate the rear reeds 119 of the auxiliary escapement system.

Figure 10:
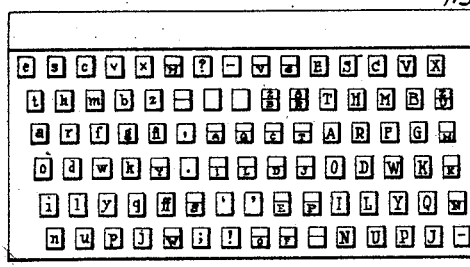
Fig. 10 is a diagram of the keyboard.

The entire auxiliary escapement-actuating system for the vertical and auxiliary tandem magazines is contained in a rectangular frame composed of side members D joined by shafts D¹, D². The operating reeds are guided in manner similar to that described in connection with the lower or primary group of reeds, their guide plates D³ being secured at their outer ends to the frame sides D and at their inner ends to a central support D⁴ suspended from the shaft D¹. The frame thus composed is supported in brackets H, J by means of the shaft D¹. The brackets also serve as support for the front distributor system, the distributor bar L being secured to the brackets, which also support shafts K from which the distributor screws and certain other elements of the distributor system are suspended. The distributor box J¹ and distributor driving element J² are attached to the distributor bar L. The frame which contains the reed guides D³ also carries horizontal rock-shafts 121 and 122, equal in number to the reeds 119, individual shafts being controlled by individual reeds. In order to economize space and thus provide for the full complement of ninety operating devices indicated by the usual ninety keys of the keyboard (Fig. 10), the rock-shafts are divided into two groups each occupying the same horizontal plane, each shaft of one of the groups bearing at its outer end in the frame side D and at its inner end in an intermediate support D⁵, and each member of the other group likewise bearing at its inner end in the intermediate support and at its outer end in the opposite frame side D. The intermediate member D⁵ is supported on the shafts D¹, D². Plates D⁶ secured to the frame sides by screws D⁷ serve to keep the rock-shafts in place longitudinally. Each rock-shaft of each group carries a pair of arms 123 and 124 which, with the exception of the first or "e" arms, are spaced apart on the rods at various distances depending upon the keyboard character or letter they represent. Each rear arm 123 (Fig. 4) has a hinged connection with a rear reed 119, and therefore receives the movement from such reed when it raised by a primary reed 52; each front arm 124 has a similar hinged connection with a front reed 120 and therefore transmits the movement downwardly so that the front reed will actuate the associated escapement B of the vertical magazine 3. Thus: the rear arm $q^3$, representing the "q" character on the keyboard is actuated when that particular key is depressed; the shaft $q^5$ is thereby rocked and moves the front arm $q^4$ and front reed $q^5$, rocking the escapement B and releasing a character "q" from the vertical magazine. A similar description applies for the release of any given character, the several reference letters with exponents indicating the particular finger-key which controls the train of parts just described. It will be noted that the rear reeds 119 of each co-acting pair are of greater length than the front reeds 120, and they may in addition be of heavier material than the front reeds, so that their excess weight will restore the parts following the release of a matrix. The escapements B (Fig. 15) are self-hinged to the front reeds 120 and therefore have a reciprocal movement therewith. When the toe or pawl end B¹ is moved outwardly from beneath the lug of the matrix O the heel B² of the escapement enters the path of the escaping matrix, but does not necessarily obstruct the matrix unless the finger-key is depressed for a sufficient interval of time to cause such obstruction, in which case the combined weight of all the matrices in a channel will tend to assist in the restoration of the escapement when the key is released. This statement applies to the several forms of escapements associated with the several magazine systems, and describes a distinctive feature of the escapements of this invention.

The escapements of the vertical and tandem auxiliary magazines act in unison; therefore when it is desired to release matrices from the tandem auxiliary magazine the matrices in the vertical magazine must be obstructed against release. For this purpose a bar M (Fig. 4) is inserted as hereinafter described and raises the matrices sufficiently to prevent their weight from hindering the restoration of the escapements B following the release of matrices from the tandem auxiliary magazine. Similarly, when the vertical magazine is being used, the matrices in the tandem magazine must be obstructed. For this latter purpose I provide a bar N secured at its opposite ends to levers $N^1$, which are pivoted on lugs $N^7$ projecting from the sides of the magazine 4. A shaft $N^2$ extends across the width of the magazine, is journaled in members $N^3$ thereon and carries at each end an arm $N^4$. When these arms are depressed they force the levers $N^1$ to the position shown in broken lines in Fig. 15, thus raising the bar N from in front of the matrices O in the magazine; and when the arms $N^4$ are raised springs $N^5$ force the bar to a position in front of the matrices, obstructing their exit. The bar N has its inner lower corner $N^6$ rounded or flared so that when forced downward it will force the matrices backward sufficiently to relieve the escapements C of their weight, in order that the escapements may act freely in unison with those of the vertical magazine when that magazine is in use. When the magazine 4 is intended to be reversible endwise to reverse the matrices therein, then the parts just described are provided in duplicate, as shown, at opposite ends of the magazine.

Those of the escapements B for the vertical magazine which are in front of the tandem magazine 4 have an extension portion $B^3$ which engages a similar extension $C^3$ of the escapements controlling the release of matrices from the tandem magazine. With the matrices in the vertical magazine obstructed against release and those in the tandem magazine free to be released, the operation of the actuating reeds as before described will cause the matrices to be released from the tandem magazine when the capital-letter keys or other keys towards the right-hand side of the keyboard (Fig. 10) are depressed. The extent of movement of the escapements is limited by their contact with the ends of the slots $P^1$ in the guide plate P.

The fulcrum rod $C^4$ on which the escapements for the tandem auxiliary magazine are pivoted is supported by arms $P^2$ extending from the escapement guide-plate P. The guide-plate is suspended from the actuating-reed guide-plate $D^3$ by means of brackets $P^3$.

The fulcrum rod $B^4$ for the escapements of the vertical magazine passes through the frame sides D and intermediate member $D^4$. The entire escapement system is thus attached to the rectangular frame before described. Therefore, when the frame is tilted to the position shown in Fig. 11 the escapements are moved away from the tandem magazine 4. But the frame cannot be thus moved until the obstructing bar N has been lowered in front of the matrices, this bar in its raised position lying in front of the supporting arms $P^2$ and hence preventing the movement of the frame from which the arms are suspended.

With the escapements moved away from the tandem magazine the magazine opening vacated by them may be closed by means of a hinged channel-plate section $4^a$, the section being held in closed position by a latch $4^b$. As shown in Fig. 11, the tilting of the supporting frame causes the tandem magazine entrance section $4^c$ to be moved from operative position in order to permit the tandem-magazine supporting-cradle to be rotated and the magazines substituted one for another and reversed endwise, according to requirements. For such purpose the entrance section is suspended by means of arms $4^d$ from a shaft $4^e$ mounted on the rear distributor beam 130. A spring $4^f$ counterbalances the weight of the magazine section and a link $4^g$ connected at one end to an extension of the arm $4^d$ and at the other end to an extension of the frame shaft $D^2$ causes the frame and magazine section to move in unison. When the auxiliary tandem magazines 4 are constructed as in Figs. 15 and 16 so as to be reversible, then the link $4^g$ should be omitted and the upper magazine section $4^c$ should be supported for manual removal in any usual manner; otherwise the square ends of these magazines as shown in Fig. 15 would prevent the upper section $4^c$ from entering or leaving operative position if mounted as in Fig. 11. When in its operative position the magazine section forces the upper obstructing bar N to a position beneath the magazine against the tension of the springs $N^5$, and a latch $4^h$ serves to hold the magazine section in place against the combined strength of the springs $N^5$. With the raising of the magazine section the springs $N^5$ serve to operate the obstructing bar N so that the magazine may be removed and reversed at will without danger of spilling the matrices.

The extent to which the vertical magazine and frame may be tilted is limited by folding links 126 and 127, one of which is pivotally connected to the stationary bracket H and the other to the frame side D, the links being joined by a hinge screw 128.

Lugs $3^a$ in opposite edges of the magazine seat in notches $D^8$ in the frame sides D, thus supporting the magazine. When tilted as in Fig. 11 the magazine may be lifted from the notches $D^8$ and inverted or another magazine substituted in its place.

The vertical magazine is designed to contain two complete fonts of matrices of different style or size. Each character or letter of each font is alternated with the corresponding character of the other font. Thus, in Fig. 23, it will be noted that a character "e" in the first channel of the magazine is alternated in the next channel with a comparatively smaller "e"; a "t" with a smaller "t", and so on throughout the width of the magazine. The channels of the magazine may therefore be considered as arranged in pairs, each pair of channels containing two characters of equal value but of different size. Each pair of channels is embraced by a single escapement B; therefore, in order that matrices may not escape from each one of a pair of channels when an escapement is actuated, it is necessary that alternate channels, i. e. one channel of each pair, be closed to obstruct the matrices therein when not in use. For this purpose I provide the bar M, having interstices $M^1$ in staggered relation in opposite edges thereof, the interstices in one edge coinciding in position with one channel of each pair of channels in the magazine, and those in the other edge coinciding with the alternate channels of the magazine. A bead or raised portion $M^2$ between the interstices serve to raise the matrices in the idle channels sufficiently to relieve the escapements of their weight, thus permitting the escapements to act freely following the release of a matrix. Two bars M may be employed and transposed to and from opposite sides of the magazine according to the font of matrices selected for use. While the bars are removed all the matrices rest on the escapements B. The bars are supported at their ends on rests $M^3$ suspended by means of a link $M^4$ and a spring $M^5$ from a projection $M^6$ in each edge of the magazine. A notch $M^7$ in the link engages a pin $M^8$ in the magazine for rendering the support positive regardless of the weight of the matrices, but the link may be disengaged from the pin $M^8$ to permit the removal and insertion of the bars, the springs $M^5$ in the meantime supporting the rests $M^3$. When the magazine is to be moved away from the escapements one of the bars must first be inverted and inserted centrally in the manner shown in Fig. 4 in order to obstruct all of the matrices. The other bar must be similarly inserted at the top of the magazine before it is reversed, and after reversal one or both bars are employed as explained for obstructing one of the fonts of matrices.

An optional method of obstructing the alternate channels of matrices is illustrated in Fig. 23 in which the bars Q are attached to opposite ends of the magazine 3 by means of a pin $Q^1$ and slot $Q^2$ connection. Grooves $Q^3$ in the bars are in continuation of alternate channels in the magazine, and beads $Q^4$ between the grooves serve to support the idle font of matrices free of the escapements B. The magazine is shiftable edgewise between the frame sides D a distance sufficient to shift alternate channels thereof in and out of alinement with the grooves $Q^3$, at will. When so shifted the bars Q are hindered from movement with the magazine by reason of their contact with the frame sides D at the top and stops $Q^5$ thereon at the bottom. The slots $Q^2$ through which the screws $Q^1$ pass permit the requisite movement of the magazine. When the magazine is shifted alternate channels of matrices will be moved from alinement with the grooves $Q^3$ to a raised and obstructed position on the beads $Q^4$, and vice versa. To obstruct all of the matrices, as when removing or inverting the magazine, the magazine is moved only half its shiftable distance, or midway between the frame sides D, in which position none of the matrices will be above the grooves $Q^3$. With the magazine in this central position the lugs $3^a$ will both be disengaged from their keeper-blocks $D^9$ and may be lifted out of the notches $D^8$ in which they seat. Latches $Q^6$ held under a friction-plate $Q^7$ by means of a shoulder screw $Q^8$ serve to hold the magazine in a selected position. The short arms $Q^9$ center the magazine for the purpose of obstructing all the matrices and a selected longer arm $Q^{10}$ will hold the magazine in a corresponding edgewise position.

If the vertical magazine is supplied with two fonts of matrices, each having three characters on both edges thereof as shown in Fig. 15, then this single magazine will be capable of providing 12 different faces of type, and these 12 faces may include several sizes. For example: The matrices in one set of channels could have on one edge a medium-thick 7-point letter in roman, italic and boldface; and on the opposed edge a comparatively lean 8-point letter in roman, italic and boldface. The font in the alternating channels could similarly provide for 9-point and 10-point in roman, italic and boldface. Thus a series of four sizes in three or more face-styles could be supplied from a single magazine. If matrices of extreme thickness, 36-point for example, are contained in the magazine, then alternate channels may be left vacant to provide the necessary room; but the large matrices may contain letters on both edges in the same or different size. For example, such matrices may have a thick 36-point letter on one edge and a lean 48-point letter on the other edge. The Janus-faced matrices for the reversible magazines of this invention may be of 1-letter, 2-letter, 3-letter or 4-letter design, as illustrated in my U. S. Letters Patent Nos. 1,310,487 (July 22, 1919) and 1,310,488 (July 22, 1919). This present invention is concerned with providing a reversible magazine as a practical means for utilizing Janus-faced matrices, rather than with the structure of the matrices, but it may be noted that the matrices are provided with distributing combinations in duplicate on each end thereof, and that the characters are in reversed position relative to opposite edges, hence the characters of the idle side will be in unreversed position and serve as indexes or reading characters when the matrices are in the asembler U.

The vertical magazine must be tilted to the position shown in dotted lines, Fig. 4, when the upper primary magazine is in use, in order that the reeds 119 of the vertical magazine will not prevent the escape of the matrices from the primary magazine; but when the tandem auxiliary magazine is in use the vertical magazine must retain the vertical position so that the reeds may serve to actuate the escapements of the auxiliary tandem magazine, in the manner explained. When the vertical magazine itself is in use both the right-hand 11 and left-hand 11' sections of the assembler entrance channel-group must occupy a position still further forward than when in the upper position under control of the cam 20. This third position is automatically dependent on the position of the vertical magazine. For this purpose the shaft $D^1$ by means of which the vertical magazine and escapement-operating system are supported, is provided with arms S having slots $S^1$ which engage pins $S^2$ in pivoted levers $S^3$. These levers are pivoted on shoulder screws $S^4$ in the brackets J, H; at their lower ends they contact with one side of pins $S^5$ in the outer ends of the channel sections 11, 11'. By reason of their being centrally pivoted, the lower ends of the levers $S^3$ move forward as the magazine moves to the vertical position, and since the arms contact with the rear side of the pins $S^5$ the hinged channel sections are caused to move forward to a position to receive matrices from the vertical magazine, the springs 41 preventing any excess forward movement of the sections. The primary reeds 52 are moved with the channel-groups and may be raised and lowered as a group in the same manner as described in connection with the primary magazines, in order that they may operate the escapements of the vertical magazine. When the magazine is again tilted the springs 41 will, under control of the studs $S^5$ cause the channel groups to again come under control of the cam 20, or the banking screws 42. If the tandem-auxiliary magazine is in use then the right hand (from front) channel-group 11' must be in its lower position as limited by the adjusting screw 42 and the left-hand section 11 must be forward, as above described in order to control the position of the reeds 52; therefore the right-hand lever $S^3$ is provided with a hinged termination $S^6$ which may be turned outward as shown in broken lines in Fig. 9 so that it will have no influence on the right-hand channel-group 11', which will then register with the tandem-auxiliary magazine to receive matrices therefrom.

Figure 14:
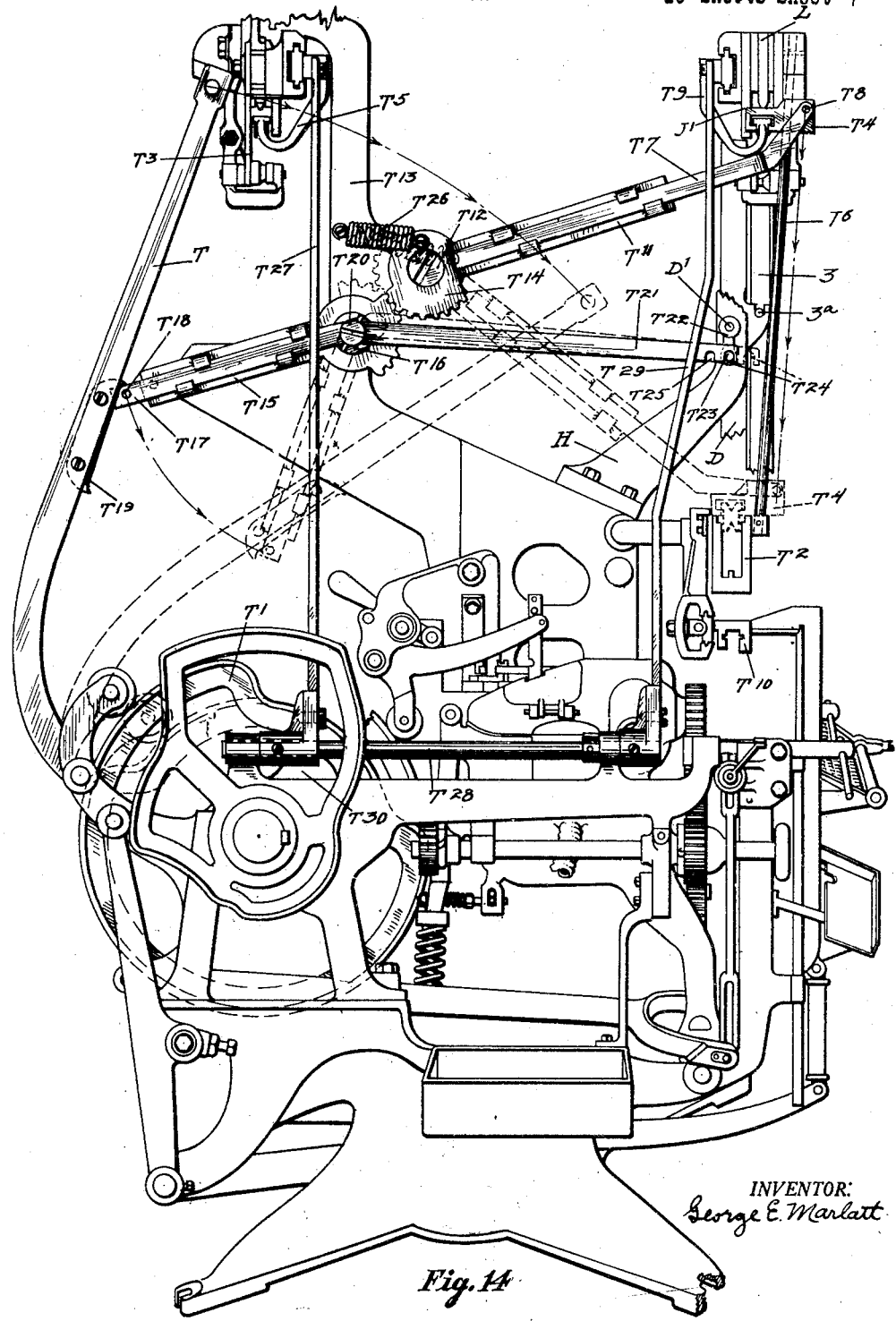
Fig. 14 is a left-hand side elevation illustrating means for shifting from one to another of two distributor systems.

Since the tandem or inclined magazines and the vertical magazine have separate distributing systems, it is therefore essential that the matrices, in the course of their distribution, be conducted to the proper distributing system according to whether the vertical or the inclined magazines are in service. As usual, the matrices are carried by an elevator arm T under control of a cam $T^1$ from the transfer channel $T^2$ to the rear distributing-box $T^3$. In this invention this usual elevator-arm T controls the action of the elevator $T^4$ which conducts matrices to the front distributor box $J^1$. The front elevator $T^4$ is guided on rods $T^6$ secured at their lower ends to the intermediate transfer channel $T^2$ and at their upper ends to the front distributor bar L. The travel of the elevator to and from the distributor box is under direct control of a compensating arm $T^7$, being connected therewith by means of a hinge pin $T^8$. This arm is so shaped that when in its upper position it will not interfere with the horizontal movement of the shifter element $T^9$ which pushes the matrices from the elevator to the distributor box, and in its lower position will not interfere with the shifting of the matrices from the "first elevator" $T^{10}$ to the front "second elevator" $T^4$. It has telescopic connection with an arm $T^{11}$ pivoted by means of a screw $T^{12}$ on the machine frame $T^{13}$. This arm is provided with sector-gear teeth $T^{14}$ and is geared thereby to a similar arm $T^{15}$ similarly pivoted on a screw $T^{16}$. This latter arm carries a slidable member $T^{17}$ having a projecting pin $T^{18}$ extending in front of a cam $T^{19}$ on the elevator arm T and capable of being engaged thereby. The slide-member $T^{17}$ is connected by means of a hinge screw $T^{20}$ to a link $T^{21}$ optionally under control of a crank-arm $T^{22}$ on the magazine tilt-shaft $D^1$. When the vertical magazine 3 is in its vertical position and the pin $T^{23}$ of the crank-arm $T^{22}$ engages the forward notch $T^{24}$ in the link $T^{21}$, then the slide-member presents the projecting pin $T^{18}$ to a position of engagement with the cam $T^{19}$ and the hinge screw $T^{20}$ which joins the link to the slide is directly in front of the pivot-screw $T^{16}$ on which the rear arm $T^{15}$ is mounted. With the parts thus positioned the descent of the rear "second-elevator" arm T will cause the cam $T^{19}$ to engage the pin $T^{18}$ and move the parts to the position shown in broken lines in Fig. 14, with the front elevator resting on the transfer channel $T^2$ and the rear elevator limited in its descent by reason of its engagement with the slide $T^{17}$; and when the rear elevator ascends a spring $T^{26}$ serves to raise the front elevator.

When the vertical magazine is tilted and therefore non-operative, the tilting thereof causes the crank-pin $T^{23}$ to draw the link $T^{21}$ and slide $T^{17}$ forward so that the pin $T^{18}$ is out of the path of the cam $T^{19}$ and therefore the descent of the rear elevator will not effect the lowering of the front elevator. But since the vertical magazine must be in its vertical position when the tandem auxiliary magazine is being used and the matrices must be carried to the rear distributor in such case, it becomes necessary to render the front elevator inoperative regardless of the vertical position of the vertical magazine. This must be done manually by engaging a rear notch $T^{25}$ in the link $T^{21}$ with the crank-pin $T^{23}$, thus drawing the slide $T^{17}$ forward with the same result as that produced by the tilting of the magazine.

The rear matrix shift-arm $T^{27}$ does not differ in action and function from that member as heretofore employed; but in this invention the shaft $T^{28}$ on which it is mounted is lengthened and carries also the front shift-arm $T^{29}$. Therefore both arms move in unison under control of the usual cam $T^{30}$, shifting the matrices from either "second elevator" to the corresponding distributor box.

The front and rear distributor systems may be accurately spaced apart by means of brace rods 131 and a turnbuckle 132 and both distributor systems are driven from the usual intermediate shaft 133, an additional pulley 134 being provided for the front distributor.

Heretofore the magazines of linotype machines have been made much wider than the actual combined thickness of the matrices contained therein would warrant. In the case of the main magazines corresponding to the primary magazines of this invention this excess width has been confined to the receiving end of the magazine, the channels converging towards the exit end in order that the channels towards the right-hand side might approach the assembler U as closely as possible, in order to facilitate the rapid assembling of the matrices. Such a magazine would of necessity be more difficult to construct than one in which the channels are parallel. In the case of the usual auxiliary tandem magazine the excess width has characterized the entire length of the magazine. This excess width in the cases of both magazines is objectionable for several reasons: The matrices will not enter and travel through the converging channels or escape therefrom with the same facility characterized by parallel channels; because of the excess width of the upper ends of the magazines a correspondingly greater length of time is required for the distribution of the matrices; by reason of the excess width of the primary magazine the tandem magazine at its exit end is of necessity spaced a considerable distance away from the primary magazine and to that extent has interfered with the rapid assembling of the matrices and in addition has required a separate keyboard located an objectionable distance away from the primary keyboard; and the entire superstructure of the machine has occupied more space and employed more material and labor in its construction than would be the case were the excess width of the magazines eliminated. The reason for thus widening the receiving ends of the magazines has been due to the fact that the matrices O in dropping from the distributor bar L could not clear the lower distributor screw E since their upper lugs $O^1$ would strike the lower screw and thus propel the matrices backward or away from the screw. Therefore if the opposed grooves $1^a$ of the magazine plates had been continued through the magazine entrance, the matrices could not have entered such channels; consequently the channels were terminated with the upper ends of the magazine plates and flared or widened at their mouths, and partitions $12^a$ were provided for the magazine entrance channel-group, the resultant channels therebetween being of sufficient dimensions in both directions to receive the matrices following the interference therewith by the lower distributor screw or by a screw-guard (not shown) provided for the purpose. It will be apparent that with such a construction the momentum of the dropping matrices is lessened when they strike the lower screw or the screw-guard and that after entering the magazine entrance-channels 12 they must accumulate additional momentum before entering the magazine-channels. This additional momentum is dependent on the relatively varying weight of the various matrices and on their varying size relative to the over-size entrance channels; also on the various angles of the channels relative to the distributor screws; therefore the matrices enter the magazine only with indifferent and varying success. It will be understood that if the interference of the lower-distributor screw E with the dropping matrices were avoided, all the above-noted objections would be obviated. Furthermore the same magazine capacity commonly provided by the primary and tandem magazine or magazines could be obtained while eliminating the tandem magazine entirely; i. e. the lower end of the usual converging magazine is approximately two-thirds the width of the receiving end thereof, and the excess width of the receiving end thereof is approximately equal to the entire width of the usual tandem magazine; therefore channels could be added to the primary magazine equal in number to those commonly employed in the tandem magazine, and the resultant rectangular magazine with the added channels would require approximately the same amount of material in its construction heretofore used in the single magazine with converging channels; a distributor bar and screw of the length commonly employed in connection with the trapeziform magazine would then serve for both the regular and additional channels; the keyboard for the additional channels; with the main magazine thus shaped, could be a continuation of the keyboard of this invention, with the requisite additional keys added to the right-hand side thereof. Therefore if separate tandem magazines were employed at all, they would add still further to the matrix carrying capacity of the machine; for example: The channels added to the primary magazine could accommodate the "lower-case" letters of a font of matrices while tandem magazines could be provided for the capital letters of the same font. Ordinarily a single tandem magazine has contained only capital letters or sets of figures. Thus six wide main magazines as provided for in this invention, supplemented by six narrow auxiliary magazines similarly mounted would be the equivalent of twelve full-size magazines of 90 channels each; and these twelve magazines supplied with 3-letter matrices as provided for in my U. S. Letters Patent No. 1,310,487 (July 22, 1919) and as indicated in some of the drawings of this invention, would therefore provide 36 complete faces of type in a much simplified machine; if the vertical magazine of this invention were added to such a machine 12 additional faces would be provided for, a total of 48 full fonts of type-faces. Or, if for example, the separate tandem and vertical magazines were eliminated entirely, and the widened primary magazines arranged hexagonally instead of triangularly about their center, thus providing for 12 primary magazines with added channels, then 72 faces of type would be the capacity of such an arrangement from the primary magazines alone. Further, since the rectangular primary magazines could be reversible just as are the auxiliary magazines of this invention, the 12 wide magazines could supply 144 type-faces from matrices having 3 faces on each edge thereof. This number would be increased or diminished according to whether 1-, 2-, 3- or 4-letter matrices were employed. In the event that the main magazines were intended to be reversible as suggested, then the escapement-sections $1^1$ thereof would have to be of substitutional character; that is, that section of the magazine plate which carries the escapements would be removed from one end and one side of a magazine and a plain channel section substituted therefor, the escapement-section being moved to the opposite end and opposite side of the magazine after removing a plain channel-section from that position. It will be understood that with so many type-faces available, certain ones thereof would be seldom used, therefore the reversing of the magazines would not be of frequent occurrence.

In order that all of the above-noted objectionable conditions may be eliminated and the suggested simplifications and improvements rendered feasible, I provide as follows: In the same plane with each channel of the magazine or magazine-entrance, as the case may be, a clearance groove $E^1$ is formed in the lower distributor screws E. As shown in the drawings herewith these grooves are in opposite sides of the screws and in straight rows across the length of the screw; but this particular arrangement of the grooves presupposes a magazine entrance in which the channels are equally spaced from each other and a distributor screw of such pitch that one-half rotation thereof will convey a matrix a distance equal to that between two successive channels $12^b$ (Fig. 18). If the entrance channels were unequally spaced, then the clearances would be formed with reference to such spacing. Otherwise stated: it is found that with the usual screw-guard removed, the matrices in dropping leave a mark or stain on the lower screw where the upper lug of the matrix strikes the screw. This mark then, would indicate the position in which the clearance should be formed. Through this clearance the upper lug $O^1$ of the matrices passes in dropping into the entrance channels, thus permitting a direct vertical drop of the matrices and rendering unnecessary the oversize partition-separated channels heretofore employed. An optional method of providing clearance for the matrices in passing the lower distributor screws is shown in Figs. 21 and 22, which illustrate a screw with a duplex thread, one groove $E^3$ serving to convey the matrices and the other groove $E^5$ providing the clearance. Both methods above described are applicable only to that type of screw having a wide thread and comparatively narrow groove for confining the matrices. A third method for causing the matrices to clear the lower distributor screw is provided for in my U. S. Letters Patent No. 1,389,369 (Aug. 30, 1921) and is in connection with a screw of different pitch and higher rotative speed than the type of screw herein illustrated. It is to be understood that the co-operating means to be described may be employed in connection with any one of the three methods explained for permitting the vertical dropping of the matrices. Also, any of the three methods will permit the use of a fourth distributor screw $E^4$ (Figs. 18 and 19) as an additional matrix conveying and guiding element. Heretofore a complete set of conveyor screws could not be used because the matrices could not pass between two lower screws in dropping to their channels. If employed, the fourth screw may be journaled in the same hangers $E^9$ which carry the upper screw $E^{10}$. In addition to the usual screw driving gears, two additional gears are necessary for driving the fourth screw, a driving gear $E^6$ being mounted on the usual lower screw and the driven gear $E^7$ on the fourth screw.

In connection with the clearances in the lower distributor screws the matrices are additionally guided through channeled bars F, which bars are an adaptation to this invention of similar guiding means disclosed in my U. S. Letters Patent No. 1,266,970 and in my application Serial No. 52,953, in which application they are either a continuation of the magazine entrance partitions $12^a$ or, in connection with the vertical magazine, are a part of the magazine as in Fig. 17 hereof. These guide bars may be suspended as shown by means of arms $F^1$ from the same shafts K that carry the distributor screws. The grooves $F^2$ being in continuation of those of the vertical magazine or of the grooves $10''$ in the magazine-entrance channels and of the clearances in the distributor screws, the matrices are therefore guided for vertical travel from the instant they start to drop and the objectional checking of their momentum is obviated. In connection with the rear distributor of this invention, when the magazines are in superposed groups and the entrance-channel movable from one to another magazine as described, then the entrance channel 12 should be longer vertically than indicated in the drawings; otherwise the angle of the entrance-channel when in register with the upper magazine would not permit the ready entrance of the matrices when passing between the lower screw E and rail F into their individual channels if constructed with opposed grooves in continuation of those in the intermediate channel-groups 10 and $10^1$. If thus lengthened the angle of the entrance channel would be less acute relative to the dropping matrices when the channel is registered with the upper magazine.

An additional feature of the matrix-guiding means of the preceding description is its adaptation to the proper distribution of matrices of various thicknesses. The matrices in their travel on the distributor bar L are suspended therefrom on interrupted or mutated ribs $L^2$, the various combinations of which co-operate with the combinations of teeth $O^2$ on the matrices to cause the matrices to drop from the bar when they have been carried by the distributor screws to a position above their individual channels. The omission of a combination of ribs on the bar L above any channel indicates the retention of a corresponding combination of teeth on the matrices stored in such channel; therefore the matrices are released from the bar when their retained combinations $O^2$ clear the ends of a combination of ribs on the bar. As commonly and preferably constructed, the matrices have their lugs $O^1$, $O^2$ flush with their forward or lead side as they appear when traveling on the bar L and their combinations flush with the opposite side. With reference to the lugs this construction contributes to the rapid assembling of the matrices in the assembler U, and with regard to the combinations it tends to so distribute the weight of the matrices that they will not swing away from the thread of the lower distributor screw when being conveyed thereby. Hence it is desirable that the common construction be retained. But since the matrices of one font may greatly exceed in thickness those of another font it follows that with the distributor bar combinations terminating in position to deliver matrices of a thin font to the magazine or magazine-entrance channels of this invention, then the ears of matrices of a much thicker font would, in the absence of preventive provision, be carried across their individual channels and could not enter therein. For example: in the "&" channel of Fig. 23 matrices of three thicknesses are shown, with their distributing teeth $O^2$ in the same vertical plane, the thinnest matrix of the three being of regular construction with the lugs and teeth flush on opposite sides. It will be apparent that, in the absence of other provision, the teeth of the thickest of the three matrices would need to be in the approximate center thereof, as shown, in order that the matrix could enter the channel with the same facility as the thinnest matrix; but, as above stated, this special construction of the matrix would be objectionable. Therefore, I terminate the distributor-bar combinations with regard to matrices of maximum thickness, so that the upper lugs of the thickest matrices will clear the ribs $F^2$ of the guide bar and the lower lugs will clear the ribs $Q^{11}$ (or $F^4$, Fig. 24) of the entrance channels at the instant the matrices are released from the distributor bar or subsequent thereto. It follows that matrices of less thickness intended for the same channel will ride upon the channel separating ribs from the instant they are released until they reach their channel. In Fig. 24, for example, the "e" matrix has cleared its combination L² and is therefore unsupported by the distributor bar, but its lugs O¹, O³ ride on the ribs F³ and F⁴ respectively, and when the lugs clear these ribs the matrix will drop into the first or "e" channel of the magazine. Hence the opposed-groove entrance channels of this invention accommodate matrices of standard construction and of any thickness permitted by the width of the magazine and the spacing of the channels thereof. At the same time matrices of unusual construction such as those shown in the "&" channel of Fig. 23 or the kind shown in Fig. 18 with the lugs O¹, O³ centered on the matrix edge, are as readily accommodated as the common form of matrix.

In Fig. 17 is shown a modification which eliminates one of the guide bars F and substitutes in place thereof an extension of one of the magazine channel-plates. The channels 1ᵃ are intersected by a transverse clearance channel 1ᶜ through which the lower lugs O³ of the matrices pass during the horizontal travel of the matrices to their individual channels. A similar clearance F⁵ is shown in Fig. 4 in connection with the guide bar F, and in my application Serial No. 52,953 (filed Sept. 21, 1915) (now issued in part as Patent No. 1,310,487) similar provision is made in connection with the entrance partitions 12ᵃ hereof, which are extended to a position just beneath the upper lugs O¹ of the matrices. If the magazine plate is made to approach the upper lugs O¹ of the matrices as closely as indicated in Fig. 17, then it becomes necessary to raise the single lower distributor screw when tilting the magazine in the manner explained. Means for raising and lowering the screws so that they are returned automatically timed with each other is provided for in my application Serial No. 52,953, and this feature may also be used in connection with the fourth distributor screw previously described. With a fourth distributor screw employed in connection with the rear distributor (Fig. 4), both bars F would take the shape of the pair of bars illustrated in connection with the front distributor (Fig. 4) and the general appearance in cross section would be similar to the enlargement in Fig. 19. With a fourth screw employed in connection with the front distributor (Fig. 4) the additional screw would bear the same relation to the rear bar F that the front lower screw E bears to the front bar F, and both channel plates of the vertical magazine would be shaped to avoid interference with the lower screws.

The riding of the matrices on the ends of the separating ribs Q¹¹, F³, F⁴ has the further advantage that any excess horizontal momentum of the matrices is checked before they reach their channels, and to this end the construction may be such that matrices of maximum thickness may also be made to ride on the ribs instead of dropping directly into the channels. But the lower matrix lugs should not ride on the separating ribs unless the fourth distributor screw is employed, since a single lower screw would tend to cause one lower corner of the matrices to lag and hinder the matrices from entering their channels. The guide bars F are rendered co-operatively shiftable by providing the necessary space F⁶ between their arms F¹ and the adjacent brackets K¹, and they may be shifted whatever distance will best serve in connection with a selected font of matrices. Another method of shifting from one to another set of channels involves the distributor bar L (Fig. 23), which is rendered shiftable longitudinally under control of a cam K² which engages a yoke K³ from which one end of the distributor bar is suspended, the opposite end being supported by a co-operating link K⁴. The yoke is centrally pivoted on a screw K⁵ in the rigid or beam portion of the distributor bar, the cam K² being also mounted thereon. A handle K⁶ integral with the cam serves for shifting the distributor bar to the right or left for registry with one or the other of the sets of channels in the magazine. The movement of the handle is limited by stop-pins K⁷, and the movement of the bar is more positively limited by contact with shoulders K⁸ of the beam. This last described method for controlling the distribution of the matrices may be best employed in connection with the notched bar M as a method for controlling the retention and escapement of the matrices as elsewhere herein described.

It will be apparent from the preceding description that matrices of common construction, regardless of their thickness, may be distributed into the opposed-groove channels of either distributor system, and that by employment of one of the shift methods described, or a combination of methods, two or more fonts of matrices, each having standard distributor combinations, may be distributed into a magazine from a common distributor bar without employing the usual partitioned entrance-channels. But it should be noted in this connection that in the case of the vertical magazine the usual over-size entrance-channels could be employed without any resultant widening of the magazine, for the reason that the arrangement of the magazine channels in pairs provides ample room for a single set of partitioned entrance-channels to accommodate the two sets of shiftable magazine channels. In connection with the inclined magazines, however, the elimination of the usual partitioned entrance-channels, combined with the provision for the direct vertical dropping of the matrices from the distributor bar, renders feasible a decided reduction in the width of the magazines, the advantages of which have been stated. Nevertheless, the usual trapezoidal magazines may be employed as illustrated in Fig. 1 when rebuilding machines already employing such magazines, without sacrificing any of the other simplifications and improvements of this invention. With the opposed-groove channels continued through the distributor entrance (Figs. 18, 19) the results will be more satisfactory in connection with magazines having parallel channels, for the reason that in connection with the usual converging magazine channels, the entrance channels would follow the same converging lines and therefore would not receive the dropping matrices as readily as parallel channels. It is partly for this reason that the usual partitioned entrance-channels are made oversize. Hence, not only does the improved distributor screw of this specification make possible the narrowing of the magazine, but the resultant paralleling of the magazine channels also renders the entrance improvements more feasible than would otherwise be the case.

As stated elsewhere in these specifications, the usual forms of keyboard and escapement mechanism are not readily adaptable to this invention. Fig. 3 illustrates a typical keyboard and escapement mechanism. It will be seen that the intermediate lever Z would not permit the turning of the magazine cradle of this invention, also that the retention of the rubber rolls $Z^1$, cams $Z^2$ etc. would not permit of the raising and lowering of the keyreeds to co-operate with the escapements of the superposed and vertical magazines of this invention. Further, any of the usual keyboard and escapement mechanisms are objectionable in the number of troublesome parts employed and are deficient in their service. For purposes of comparison, the mechanism shown in Fig. 3 may be considered one of the simplest and best employed in connection with multiple magazine machines. It will be noted that in addition to the 90 keylevers and reeds retained in this invention, 9 additional parts are common to each of the 90 keys (91 including the space key) namely: a weight $Z^3$, a trigger $Z^4$, a cam yoke $Z^5$, a 3-part cam $Z^2$, a spring $Z^6$, a hook $Z^7$ therefor, and the intermediate lever Z. These may be considered keyboard parts inasmuch as they are common to all the magazines of a multiple magazine machine. Therefore about 820 keyboard parts are eliminated in this invention. Added to this is an economy of not less than 4 escapement parts for each of the ninety channels of each magazine, or 360 for each primary magazine. Therefore the six-magazine group shown in Fig. 1 would employ about 2160 fewer parts than six magazines employing the older forms of escapement, which, added to the economy in keyboard parts, amounts to an economy of about 2,980 parts. Otherwise stated, the keyboard and six primary magazines of this invention employ fewer keyboard and escapement parts than the keyboard and but one magazine of the usual construction. This economy of parts also continues to the auxiliary magazines, for, considered as escapement parts, the rear 119 and front 120 keyreeds, the horizontal rods 121, 122, the arms 123, 124 thereon, the vertical magazine escapement B and the tandem magazine escapement C total 7 parts; but these parts serve for two sets of channels in the vertical magazine and for the three auxiliary tandem magazines, therefore, less than 2 parts per channel are employed in the combination of magazines; and, by reason of the magazines being reversible, they serve for twice the number of type faces that could otherwise be accommodated in a like number of channels. The objection to perforating the matrix channels for the usual escapement pawls has already been stated herein. The usual keyboard construction is also objectionable inasmuch as the rubber rolls and cams are the chief source of annoyance in the operation of linotype machines. The rubber rolls and cams limit the speed at which double-letters, leader and space matrices may escape from a magazine channel, for a matrix may escape only at each rotation of a cam. But with the form of escapement illustrated in Fig 3, the cams and rolls necessarily are retained to overcome the essential escapement spring $Z^8$ and to give the escaping matrices time to overcome the roughness of their channels incident to the older forms of escapements. Probably the chief source of annoyance in connection with the mechanism of Fig. 3 is the recurring failure of the parts to function due to slippage between the rolls $Z^1$ and cams $Z^2$ when the rolls become hard, worn or coated with oil from the cam pivots or elsewhere. The rubber rolls are sensitive to weather conditions and will not function properly when the surrounding temperature is low. Also the stop pins $Z^9$ for the cams frequently break off, and various other accidents, incident to the multiplicity of small working parts, occur. Further, the key levers of the power driven keyboard frequently fail to return after being depressed, in which event all the matrices in a channel may escape. Besides the objectionable mutilation of the magazine channels to accommodate the usual forms of escapements, their construction and action sacrifice true mechanical principles. Although the verges $Z^{10}$ and links $Z^{13}$ follow the lines of the converging channels of the magazine, they are pivoted in common on the straight rod $Z^{11}$ and partitions (not shown) are required to keep them alined with the channels; but the intermediate levers Z are truly pivoted on the rod $Z^{12}$ and therefore strike the links $Z^{13}$ at various incorrect angles according to the angle of the associated channel of the magazine. Hence, such an escapement is in the nature of a makeshift. Therefore, both the keyboard and escapement mechanisms of this invention are a decided improvement in many respects over those heretofore employed. In the keyboard as heretofore constructed the "touch" of the keys is dependent on the weights $Z^3$ plus a slight friction between the trigger $Z^4$ and yoke $Z^5$. In this invention the same "touch" may be retained by making the reeds 52 of suitable weight.

Having thus described the construction and operation of my invention and outlined its advantages and possibilities, what I claim as new and desire to secure by Letters Patent of the United States, is:

1. In a typographical machine, matrix magazines arranged in superposed groups about a common center, means for rotating the several groups about their center in order to render a selected group operative; a magazine-entrance channel-group movable to register with a selected magazine of a selected group, an assembler-entrance channel-group movable to register with a selected magazine of a selected group; means for moving said magazine-entrance channel-group and said assembler-entrance channel-group in unison for joint registry with a selected magazine; a vertical magazine mounted independently of said rotatable groups of magazines, means for further moving said assembler-entrance channel-group to register with said vertical magazines; escapements associated with each of said magazines, a group of key-controlled reeds for actuating said escapements, means for raising and lowering said group of reeds longitudinally to and from operative relation with the escapements of a selected magazine, other means for moving said group of reeds laterally to and from operative relation with the escapements of a selected magazine, and means for causing said lateral movement of the reeds to occur in unison with the movement of said assembler-entrance channel-group to and from registration with a selected magazine.

2. In a typographical machine, a group of matrix magazines mounted on and around the longitudinal center of a rotatable cradle having a tubular shaft for its center, supports for each end of said shaft, an operating screw extending longitudinally through said shaft and journaled in the supports thereof, spiral grooves formed within said tubular shaft, a nut on said operating screw and in operative engagement with said spiral grooves, and means for holding said nut against turning in order that rotation of the operating screw will cause a lateral movement of said nut and thereby transmit a controlled rotary movement to said cradle and the magazines thereon for the purpose of moving selected magazines to or from operative position.

3. In a typographical machine, matrix magazines mounted for selective use on a rotatable cradle having its center of rotation below the magazine in operative position, means for rotating said cradle for rendering a selected magazine operative, a detent for locking said cradle against rotation, escapement-operating reeds for releasing matrices from said magazines, and means for preventing the withdrawal of said detent when said escapement-operating reeds are in a position to interfere with the rotating of said cradle.

4. In a typographical machine, in combination with superposed inclined matrix-magazines each occupying individual operative positions, a single assembler entrance channel for conducting matrices from such magazines, said entrance channel having a lower vertical portion and a relatively shorter angle portion thereabove and hinged thereto for conducting matrices from said magazines to said vertical portion, and means whereby said angle portion is controlled for pivotal movement from one to another of said magazines for selective register therewith.

5. A combination as specified in claim 4, including also a vertically-mounted matrix magazine and means whereby the upper section of the assembler-entrance is rendered additionally movable for registration with said vertically-mounted magazine.

6. A combination as recited in claim 4, including also a vertically-mounted matrix-magazine movable to and from operative position, and means whereby the hinged angle portion of the assembler entrance channel is movable under control of said vertical magazine to and from register therewith according to the operative or non-operative position thereof.

7. A combination as recited in claim 4, including also a vertically-mounted matrix-magazine, means whereby the hinged angle portion of the assembler entrance channel is additionally moved to register with said vertical magazine, an inclined magazine tandem to the said superposed inclined magazines, a separately movable extension of the angle portion of the entrance channel for conducting matrices from either said vertical magazine or said tandem magazine, and means whereby said angle portion and said extension thereof may be caused to occupy either the same or different angular positions in order that either said vertical magazine or said tandem magazine may be rendered operative.

8. In a typographical machine, in combination, a primary inclined matrix magazine, an inclined matrix magazine tandem thereto, a vertical matrix magazine in front of said primary and tandem magazines, an angular channel divided for separate register relative to any of said magazines, a distributer for said inclined magazines, another distributer for said vertical magazine, separate matrix-elevators for each of said distributers, and means whereby the operative or non-operative position of the vertical magazine will determine the corresponding position of said angular channel and render operative or non-operative a corresponding matrix-elevator, all in unison.

9. A combination as specified in claim 8, characterized by the inclusion of means whereby the elevator associated with the distributor for the vertically-mounted magazine may be rendered inoperative regardless of the operative position of the vertically-mounted magazine when the tandem magazine is in use and the vertically-mounted magazine is not in use.

10. In a typographical machine, a primary matrix-magazine system, matrix-magazines tandem thereto arranged to be rotated about a common center for selective use, a channeled entrance-section common to all of said tandem magazines; matrix-escapements common to all of said tandem magazines, a structure and mechanism for moving said escapements to and from operative connection with said tandem magazines, and connections whereby said magazine entrance-section is moved to and from operative position in unison with said escapements in order that said tandem magazines may be selectively rotated when said escapements and said entrance-section are moved from operative position.

11. In a typographical machine, matrix-magazines arranged about a common center, a magazine-entrance element and an assembler-entrance element between which said magazines are selectively registerable for co-operative use therewith; a cradle upon which said magazines are mounted, the center of rotation for said cradle being below said magazine-entrance and assembler-entrance elements; fixed supports upon which said cradle is mounted, an operating screw extending longitudinally through the center of rotation of said cradle, a nut on said operating screw held against rotation and guided for longitudinal movement on said screw, spiral grooves formed within the longitudinal central structure of said cradle for engaging said nut, and an operating handle for said screw, all for the purpose of causing said magazines to be rotated for selective use when said handle is turned.

12. A combination as specified in claim 11, including also detent means for locking said cradle in a selected position, and a connection between said operating handle and said detent means whereby said detent becomes inoperative when said handle is operative, together with means for limiting the extent of rotation of said cradle.

13. In a typographical machine, superposed matrix-magazines each in a different operative position, a radially movable magazine entrance-channel common to said magazine for conducting matrices thereto; a rigid, vertical assembler-entrance common to said magazines and having an angular upper portion radially movable from one to another of the magazines for conducting matrices therefrom, and means whereby said magazine entrance-channel and said assembler-entrance angular portion may be co-actively registered with a selected one of said magazines for the purpose of conducting matrices thereto and therefrom, respectively.

14. A combination as specified in claim 13 including also matrices in the magazines recited therein, escapements for each of said magazines for releasing said matrices, operating reeds for said escapements, and means whereby said reeds are movable with said angular section of the assembler-entrance from one to another of said magazines for operating the escapements associated therewith.

15. In a typographical machine, in combination, a keyboard, a matrix-storage magazine of greater width than said keyboard, channels in said magazine, matrices in said channels corresponding in order of arrangement with the keys of the keyboard, escapements for said matrices corresponding as to number with the keys of the keyboard, operating reeds leading from said keyboard, other operating reeds leading to said escapements and variously offset relative to said keyboard reeds, transverse rock-shafts between said keyboard reeds and said escapement reeds, a hinged connection between each of said keyboard reeds and an associated rock-shaft, and a relatively offset connection between said rock-shaft and an associated escapement-operating reed, all for the purpose of actuating said escapements from said keyboard regardless of the width of said magazine in excess of the width of said keyboard.

16. A combination as specified in claim 15, characterized by the inclusion of an additional magazine, means whereby the escapements of said first-mentioned magazine serve to actuate the escapements of said additional magazine, and means for obstructing the matrices in either of said magazines against escapement when the other magazine is in use.

17. A combination as specified in claim 15, characterized by the fact that the channels in said magazine are arranged in pairs, that a single escapement serves for each pair of channels, and the inclusion of means whereby one or the other of each pair of channels may be closed and rendered idle in order to prevent the escapement of the matrices therefrom when an alternate channel is in service.

18. A combination as specified in claim 15, characterized by the fact that the channels in the magazine therein recited are arranged in pairs, that a single escapement serves for each pair of channels, and the inclusion of means whereby one or the other or both of each pair of channels may be closed and rendered idle in order to prevent the escape of matrices therefrom.

19. A combination as specified in claim 15, characterized by the fact that the magazine recited therein is shiftable relative to the escapements, that the channels in said magazine are arranged in alternating multiples for accommodating multiple fonts of matrices, and the inclusion of the specified means whereby the shifting of said magazine relative to said escapements will cause a selected one of said fonts of matrices to be active.

20. A combination as specified in claim 15, characterized by the fact that the magazine recited therein is shiftable relative to the escapements, that the channels in said magazine are arranged in alternate multiples for accommodating multiple fonts of matrices, and the inclusion of the specified means whereby the shifting of said magazine relative to said escapements will cause a selected one or both of said fonts of matrices to be active or inactive, at will.

21. In a typographical machine, a vertically-mounted matrix-magazine having escapements for retaining and releasing matrices contained therein and an inclined magazine having escapements for likewise retaining and releasing the matrices contained therein, both systems of escapement being attached to said vertical magazine; means whereby the escapements of the vertical magazine operate those of the inclined magazine, means for moving said vertical magazine to and from operative position, and means whereby the matrices in the inclined magazine must be locked against spillage before said vertical magazine is moved from operative position.

22. In a typographical machine, in combination, a matrix magazine having matrices therein arranged in alternating active and inactive channels, a matrix locking and unlocking bar for rendering one or the other of alternate magazine channels active or inactive at will, channels in said bar in continuation of alternate channels of the magazine for rendering such alternate channels active, a matrix escapement common to each active channel and an adjoining inactive channel, and a bead between and alternating with each channel of said locking bar, said bead serving to support the matrices in inactive channels free of the associated escapements in order to permit the free return movement of the escapements following the release of matrices from the active channels.

23. A combination as specified in claim 22, characterized by the fact that the magazine recited therein is reversible for the purpose of reversing the matrices contained therein, that the said locking bar is provided in duplicate at each end of the magazine and that the channels in each of said bars serve as exit channels when the bar is in its lower position and as entrance channels when the bar is in its upper position.

24. In a typographical machine, in combination, a magazine having channels for guiding matrices to a position for release therefrom, matrices in said channels, and escapements mounted to oscillate transversely beneath said channels, said escapements having pawls of a semi-circular character which enter and leave said channels through the sides thereof in a circular path when the escapement is oscillated, thereby releasing the matrices.

25. In a typographical machine having matrices stored in a magazine, escapements for releasing said matrices, said escapements each having two pawls capable of traveling in a circular path across an associated channel in the magazine, one of the pawls entering the channel while the other leaves it, and one of said pawls having a beveled edge which is acted upon by the matrices to restore the escapement to normal position.

26. In a typographical machine, in combination, an escapement for releasing matrices from a magazine, a vertical reed for actuating said escapement, a horizontal finger-key lever direct-connected to said vertical reed, and means for holding said reed and said lever normally connected but permitting independent movement of the finger-key lever when the movement of said escapement is abnormally hindered.

27. In a typographical machine, in combination, a magazine having a series of matrix-guiding channels therein, separating ribs between said channels, matrices in said channels, an escapement mounted longitudinally beneath each of said channels, matrix-releasing pawls on said escapements, clearances in each of said separating ribs for receiving said escapement pawls, an opening through the floor of each of said channels for convenience in inserting said escapements, a channel-floor strip for closing said opening when the escapement is inserted, and means for actuating said escapement to cause one of the pawls thereon to move from a channel for releasing a matrix while the other pawl thereon enters such channel for obstructing a following matrix.

28. A combination as specified in claim 27, characterized by the fact that the matrix-obstructing pawl recited therein has a beveled edge capable of being engaged by the matrices, such engagement tending to restore the escapement following its matrix-releasing action.

29. In a typographical machine, in combination, a magazine having channels therein, matrices in said channels, a continuous floor in each of said channels, separating ribs between said channels, escapements having pawls for controlling the release of said matrices, and a structure and mechanism whereby said pawls enter and leave said channels through said separating ribs.

30. In a typographical machine, in combination, a magazine, matrices therein, an escapement A for releasing said matrices, said escapement having fore and aft pivot points $A^1$, matrix-releasing and obstructing pawls $A^2$ and $A^3$, and an operating lever $A^4$; clearances in said magazine for convenience in assembling said escapements, and means for closing said clearances when the escapements are assembled.

31. A combination and structure as specified in claim 30, characterized by the fact that the rear escapement pawl $A^3$ has a beveled edge $A^5$ capable of being acted upon by the matrices to restore the escapement following the release of a matrix.

32. A combination as specified in claim 30 characterized by the fact that the escapements described therein are arranged in series, and including means for locking said series of escapements against movement when the magazine with which they are associated is not in use.

33. In a typographical machine, in combination, a magazine having channels therein, matrices in said channels, upper and lower lugs on each edge of said matrices, and an escapement B for each of said channels, said escapement having a positive matrix-stopping and releasing end $B^1$ and a potentially-obstructing end $B^2$, said obstructing end being capable of obstructing said matrices only when retarded to do so, and said matrices tending to restore said escapement when thus retarded.

34. A combination as specified in claim 33, characterized by the fact that each escapement of the form recited therein is capable of controlling the release of matrices from a group of magazine channels.

35. In a typographical machine, in combination, a magazine having opposed-groove channels arranged in groups, matrices in said channels, a single escapement associated with each group of channels, a single escapement-operating reed for each escapement, and means whereby the matrices in any selected one of a group of channels may be released by an associated escapement.

36. In a typographical machine, in combination, a magazine-entrance having opposed-groove channels formed therein, a distributor-bar from which matrices may be distributed directly into said channels, matrices capable of being so distributed, a set of upper and lower screws for conveying said matrices to said channels, upper and lower lugs on said matrices for engaging said screws, and clearances in the lower of said screws through which the upper lugs on the matrices may pass to permit their entry into the opposed grooves of said channels.

37. A combination as specified in claim 36, including also supplementary guiding means between the planes of the upper and lower of said distributor screws, said guiding means having clearance and guiding grooves formed therein in vertical alinement with the grooves in said entrance-channels and in the same vertical plane with the clearances in the lower of said distributor screws.

38. In a typographical machine, in combination, a magazine-entrance having opposed-groove channels, a distributor-bar from which matrices may be released and distributed directly into said channels, matrices capable of being so released and distributed, a set of upper and lower screws for conveying said matrices to said channels, upper and lower lugs on said matrices for engaging said screws, clearances in the lower of said screws through which the upper lugs of the matrices may pass to permit their entry into the opposed grooves of said channels; supplementary guiding means between the planes of the upper and lower of said distributor screws and having clearance and guiding grooves therein in alinement with the grooves in said magazine-entrance channels and with the clearances in the lower of said distributor screws; provision for releasing the matrices from the distributor-bar in advance of the entrance channels, and means for supporting the matrices while being conveyed to their channels subsequent to their release from the distributor-bar.

39. In a typographical machine, in combination, a channeled magazine entrance, a distributor bar from which matrices may be released and distributed into the channels of said entrance, matrices capable of being so released and distributed, a set of distributor screws for conveying said matrices to said channels, and matrix supporting and guiding means having notches therein for conducting said matrices to their channels subsequent to their release from the distributor bar, said supporting and guiding means being provided with horizontal supporting edges and vertical grooves and being capable of supporting said matrices between said grooves without dependence on said distributor screws or any one thereof.

40. In a typographical machine, in combination, a magazine having channels therein arranged in groups, matrices in said channels and capable of being released therefrom and distributed thereto, means for rendering one channel of each group operative selectively, a distributor-bar from which the matrices are distributed to individual channels of the magazine, upper and lower distributor screws for conveying said matrices to said channels, and supplementary guiding and supporting means for said matrices, said supplementary means being capable of adjustment relative to said channels for the purpose of causing the matrices to be distributed to selected channels in said groups of channels.

41. A combination as specified in claim 40, characterized by the fact that the distributor-bar recited therein is also adjustable, either co-operatively with the supplementary guiding means or in lieu thereof.

42. In a typographical machine, in combination, a magazine having matrices disposed in alternating channels thereof according to font, entrance and exit channels in continuation of alternate channels of said magazine, and means for registering selected alternate channels of said magazine with said entrance and exit channels for the purpose of rendering a selected font of matrices active or idle at will.

43. In a typographical machine, in combination, matrices having characters on each edge thereof and distributing combinations on each end thereof; a magazine for storing, receiving and releasing such matrices, and a structure and mechanism as specified for rendering said magazine reversible for the purpose of reversing said matrices according to the edge thereof selected for use.

44. In a typographical machine, in combination, superposed magazines each having an escapement system for releasing matrices therefrom, reeds for operating said escapements, finger-key levers normally direct-connected with said reeds, means for raising and lowering said reeds in series for co-operation with one or another of said escapement systems, and means for connecting and disconnecting said reeds and key levers to permit the raising and lowering of the reeds to and from either escapement system, selectively.

45. A combination as specified in claim 44, characterized by the fact that all of the finger-key levers engage the escapement-operating reeds in the same horizontal plane.

46. A combination as specified in claim 44, characterized by the fact that the upper of said escapement systems is forward of the lower escapement system, and the inclusion of means whereby the upper position of said escapement-operating reeds involves their forward position throughout their length and the lower position thereof involves their rearward position throughout their length.

47. A combination as specified in claim 44, including also means whereby the key-levers recited therein are locked against displacement while the escapement-operating reeds remain disconnected therefrom.

48. A combination as specified in claim 44, characterized by the fact that the key-levers recited therein are arranged in banks, and including the specified means whereby a single fulcrum rod serves for two banks of key-levers, said fulcrum rods being spring-supported for the purpose of permitting the independent movement of said key-levers in the event of an abnormal condition hindering the movement of said reeds.

49. In a typographical machine, superposed matrix-magazines movable as a unit to and from a position wherein one at a time of said magazines may be rendered operable; a matrix-escapement system for each of said magazines; a magazine-entrance channel-group movable radially from one to another of said magazines, co-acting means for rendering the magazines selectively operable relative to their delivery ends, including an assembler-entrance channel-group movable radially from one to another of the magazines, and a series of escapement-operating reeds movable from one to another of said escapement systems; means for so moving said reeds, a series of finger-key levers to which said reeds are normally direct-connected as an essential condition to the longitudinal movement thereof relative to said escapement systems, and a sensitive escapement A as an essential condition to the direct-connection between said key-levers and said reeds.

50. A combination as specified in claim 49, including also a vertical magazine to and from which said assembler-entrance channel-group and said escapement-operating reeds are additionally movable, and a system of sensitive escapements B for said vertical magazine as a further condition for the direct-connection between said key-levers and said escapement-operating reeds.

51. A combination as specified in claim 49, including also the specified safety devices for preventing the movement of said superposed magazine toward or from operative position in the event that said escapement-operating reeds are in position to interfere with the completion of such movement of the magazines.

52. A combination as specified in claim 49, including also a vertical magazine to and from which the assembler-entrance channel-group and the escapement-operating reeds are additionally movable, a system of sensitive escapements B for said vertical magazine as a further condition for the direct connection between the key-levers and the escapement-operating reeds; and a magazine tandem to the superposed magazines, an escapement system for said tandem magazine, and a structure and mechanism whereby the escapements C of said system are actuated by the escapements associated with the vertical magazine.

53. In a typographical machine, in combination, matrices having characters in reversed position, relatively, on opposite edges thereof and distributor combinations on opposite ends thereof, a channeled magazine through which said matrices circulate, and means for reversing said magazine end for end in order to render the characters on either edge of said matrices active or inactive, selectively.

54. In a typographical machine, in combination, a channeled magazine, matrices capable of entering the channels of said magazine, said matrices having upper and lower screw-engaging lugs on each edge thereof, and upper and lower distributor screws for conveying said matrices to the channels of said magazine, said screws being equal in number to the lugs on said matrices and the lower of said screws each having clearances formed therein through which the upper lugs of the matrices may pass to permit their entry into the channels of the magazine.

55. In a typographical machine, in combination, a single, continuous matrix magazine having a series of escapements for controlling the release of matrices therefrom, a keyboard narrower than said magazine and having a series of keys offset progressively relative to said escapements, a lower-section series of escapement operating reeds leading from the keyboard keys, an upper-section series of escapement-operating reeds leading to the magazine escapements, and motion-transmitting devices connecting said lower-section reeds with said upper-section reeds, whereby a selected keyboard key may operate a relatively offset associated magazine escapement.

56. A typographical distributing mechanism including, in combination, a distributor bar formed to release a matrix at one point, and cooperating means adapted to give support to said released matrix and drop it at a different point, said means being movable from one to another operative position, as required, according to the distributing point of the matrices undergoing distribution.

57. A typographical distributing mechanism including in combination, a distributor bar formed with a series of matrix releasing combinations, and cooperating means to give support to the released matrices and drop them at same points so that thick matrices of one font will drop directly into their channels and thin matrices of another font will be temporarily supported before dropping into their corresponding magazine channels.

58. A typographical distributing mechanism including, in combination, a distributor bar, and a pair of matrix sustaining rails adapted to cooperate therewith and support such matrices after released for a distance equal the difference between the thickest and thinnest font for which the distributor is adapted.

59. A typographical distributing mechanism including, in combination, a distributor bar formed with a series of matrix releasing combinations, and a pair of matrix sustaining rails adapted conjointly to support matrices released from the bar and drop them at predetermined points, regardless of the construction of such matrices relative to the distance between their distributing teeth and supporting lugs.

60. A typographical distributing mechanism, including, in combination, a distributor bar formed with a series of matrix releasing combinations, and a pair of matrix sustaining rails extending along the opposite sides of the bar, said rails being notched at different points in their length and acting conjointly to release the matrices at corresponding points, regardless of the thickness variations of matrices in different fonts.

61. In a typographical distributing machine adapted to be equipped with different sets of matrices, those of each set being provided at their upper ends with projecting ears, the combination of a distributor bar formed with a series of matrix releasing combinations, and a pair of matrix sustaining rails extending along the opposite sides of the bar, said rails having opposite ribs between said releasing combinations and the distributing points of the matrices and capable of being engaged by the projecting ears of the matrices and thus supporting the matrices so that those of different sets thereof will be distributed at the same points regardless of variations in construction and thickness between matrices of different sets.

62. In a typographical machine comprising matrices each formed with a distributing combination and with projecting ears at its upper and lower ends, the said combination and projecting ears being located in different longitudinal planes, the combination with a channeled magazine wherein the matrices are stored, a distributor having a series of combinations to cooperate with those of the matrices, and a magazine entrance separate and distinct from the magazine and formed with sets of opposing grooves lying in vertical planes offset relative to the distributor combinations, of a pair of supplemental guiding means forming part of said magazine entrance and arranged at the receiving end thereof to insure the engagement of the upper ears of the matrices in the entrance grooves, said supplemental guiding means having opposite matrix supporting points all in advance of said sets of opposing grooves.

63. In a typographical machine, in combination, a channeled magazine entrance, a distributor bar from which matrices may be released and distributed, matrices capable of being so released and distributed, a set of upper and lower screws for conveying said matrices to said channels, upper and lower lugs on said matrices for engaging said screws, matrix-supporting means between the upper and lower of said screws and having oppositely disposed supporting ribs in advance of said entrance channels, and provision for releasing the matrices from the distributor bar above said oppositely disposed supporting ribs, in order that the opposite supporting ribs on said supporting means may determine the point at which the matrices enter the magazine.

64. In a typographical machine equipped with matrices each having distributing teeth on the end thereof and projecting ears on each edge thereof, and employing a distributor bar formed with a series of matrix releasing combinations, an inclined channeled magazine for receiving said matrices subsequent to their release from said distributor bar, and a curved magazine entrance for conducting said matrices to the channels of said magazine, means whereby the width measurement of said magazine throughout its length may be limited to the accumulative measurement of matrices of the maximum thickness designed to be contained in the channels thereof, said means consisting in providing said curved magazine entrance with opposed grooves in continuation of the channels in said magazine and providing for the release of certain of said matrices from said distributor bar in advance of the opposed grooves to which they are destined, and including means for supporting said matrices from the time of their release from said distributor bar to the time of their entrance into the opposed grooves of said curved magazine entrance.

65. In a typographical machine equipped with matrices having distributing combinations thereon and ears on the edges thereof, a channeled magazine having grooves for receiving the ears of said matrices in order that the matrices may be stored in columns according to character in the channels of said magazine, and a distributor bar having a series of matrix releasing combination cooperating with the distributing combinations on said matrices for the purpose of distributing them to individual channels, distributing means whereby the channels in said magazine may be formed in a parallel series of an accumulative width not exceeding the maximum accumulative width of the matrices to be contained therein, said distributing means consisting in providing for the release of said matrices from said distributor bar in advance of the channels for which they are destined and supporting them independent of said distributor bar from the time of their release therefrom to the time of their entrance into their individual channels.

66. A structure and combination as set forth in claim 65 characterized by the fact that the magazine therein recited is designed to contain matrix fonts of different accumulative thicknesses and that matrices in fonts of certain thickness may enter directly into their channels when released from said distributor bar.

67. A structure and combination as recited in claim 65 characterized by the fact that the magazines therein recited is supported in inclined position, and including a curved magazine entrance having opposed-grooved channels therein in continuation of the channels of said magazine for the purpose of conducting said matrices from their points of release to their individual magazine channels.

68. In a typographical machine, in combination, matrices having distributing combinations on the end thereof and projecting ears on the edges thereof, a distributor bar having a series of matrix releasing combinations corresponding to the distributing combinations on said matrices, magazine entrance channels for receiving said matrices from said distributor bar, a set of distributor screws for conveying said matrices on said distributor bar to their individual channels, and means for checking the momentum of said matrices when released from said distributor bar in order that they may not be carried beyond their channels, said means comprising a pair of rails F between said distributor bar and said entrance channels, said rails being capable independently of said distributor screws of supporting said matrices between their channels and having a series of oppositely disposed notches therein in the planes of said entrance channels, through which notches the ears of said matrices may clear and enter their channels after being supported by said rails for the purpose of checking their momentum.

69. In a typographical machine, in combination with matrices having distributing combinations on the end thereof and upper and lower ears projecting from the edges thereof, and upper and lower distributor screws capable of engaging the ears of said matrices and conveying them on a distributor bar to individual points of release therefrom, means for causing the upper ears on said matrices to clear the lower distributor screws for the purpose specified, said means being a continuous idle groove in alinement with the active groove of said lower screw.

70. In a typographical machine employing matrices capable of being distributed to individual channels, and a distributor bar having a series of releasing combinations thereon for determining the channels to which individual matrices may be distributed, means for causing matrices in fonts of different thicknesses to be conveyed to their proper channels regardless of the varying position of individual releasing combinations on said distributor bar relative to associated channels, said means comprising a series of opposite supports for said matrices disposed between their individual points of release and their individual channels and capable of supporting said matrices without dependence on the conveying means.

71. In a typographical machine having superposed matrix magazines with matrices therein and capable of release therefrom, and an angular throat through which said matrices are conducted from said magazines, means for rendering said throat capable of conducting said matrices from either of said magazines, said means consisting in rendering the angular portion of said throat movable pivotally from one to another of said magazines, selectively, without varying its length or shape.

72. In a typographical machine, in combination, a distributor bar from which matrices are released into channels, matrices having upper and lower lugs on the edges thereof, upper and lower distributor screws for engaging the lugs of said matrices and conveying them to points of release on said distributor rail, and clearances associated with the lower of said distributor screws for permitting the upper lugs of said matrices to clear said lower screw, said clearances being in the thread of said lower screw as distinguished from clearances through said thread.

In testimony whereof I hereunto affix my signature this 18th day of March, 1922.

GEORGE E. MARLATT.